(12) United States Patent
Iwasaki et al.

(10) Patent No.: US 9,087,388 B2
(45) Date of Patent: Jul. 21, 2015

(54) IMAGE GENERATION DEVICE AND IMAGE GENERATION METHOD

(75) Inventors: Masahiro Iwasaki, Kyoto (JP); Lorcan MacManus, Cambridge (GB); Neil Dodgson, Cambridge (GB); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 650 days.

(21) Appl. No.: 13/001,627

(22) PCT Filed: Jul. 28, 2009

(86) PCT No.: PCT/EP2009/005459
§ 371 (c)(1),
(2), (4) Date: Dec. 28, 2010

(87) PCT Pub. No.: WO2010/012447
PCT Pub. Date: Feb. 4, 2010

(65) Prior Publication Data
US 2011/0102551 A1      May 5, 2011

(30) Foreign Application Priority Data

Jul. 30, 2008   (WO) ................ PCT/EP2008/006291

(51) Int. Cl.
*G06T 15/00* (2011.01)
*G06T 17/00* (2006.01)
(Continued)

(52) U.S. Cl.
CPC . *G06T 3/40* (2013.01); *G06T 15/04* (2013.01); *G06T 15/50* (2013.01); *G06T 2210/36* (2013.01)

(58) Field of Classification Search
CPC .. G06K 2209/40; G06K 9/0061; G06T 15/04; G06T 17/00; G06T 15/00; G06T 15/205; G06T 17/05; G06T 17/10; G06T 7/004; G01B 11/25
USPC ................ 356/604; 348/42–60; 345/418–420
See application file for complete search history.

(56) References Cited

U.S. PATENT DOCUMENTS

| 7,688,363 B2 | 3/2010 | Sato et al. |
| 7,893,971 B2 | 2/2011 | Sato et al. |

(Continued)

FOREIGN PATENT DOCUMENTS

| CN | 1771540 | 5/2006 |
| CN | 1805354 A | 7/2006 |

(Continued)

OTHER PUBLICATIONS

International Search Report issued Feb. 3, 2010 in International (PCT) Application No. PCT/EP2009/005459.
(Continued)

*Primary Examiner* — Chikaodili E. Anyikire
*Assistant Examiner* — Farhan Mahmud
(74) *Attorney, Agent, or Firm* — Wenderoth, Lind & Ponack, L.L.P.

(57) ABSTRACT

Provided is an image generation device generating a high-quality image of an object under a pseudo light source at any desired position, based on geometric parameters generated from a low-quality image of the object. The image generation device includes: a geometric parameter calculation unit that calculates a first geometric parameter regarding a shape of a surface from light source position, viewpoint position, and geometric normal information regarding the shape; a high-resolution database unit that stores an exemplum indicating a mesostructure of a portion of the surface and has a spatial resolution higher than the geometric normal information; an exemplum expansion unit that increases the exempla to be spatially expanded; a geometric parameter modification unit that modifies the first geometric parameter using the increased exempla; and an image generation unit that generates an output image by applying the modified geometric parameter to a reflection model.

10 Claims, 26 Drawing Sheets

(51) Int. Cl.
*G06T 1/00* (2006.01)
*G06F 17/00* (2006.01)
*H04N 13/00* (2006.01)
*H04N 13/02* (2006.01)
*G06T 3/40* (2006.01)
*G06T 15/04* (2011.01)
*G06T 15/50* (2011.01)

(56) References Cited

U.S. PATENT DOCUMENTS

| | | | |
|---|---|---|---|
| 2002/0050988 A1* | 5/2002 | Petrov et al. | 345/418 |
| 2005/0012757 A1* | 1/2005 | Park et al. | 345/582 |
| 2005/0190670 A1 | 9/2005 | Kim et al. | |
| 2006/0003328 A1 | 1/2006 | Grossberg et al. | |
| 2006/0239584 A1 | 10/2006 | Motomura et al. | |
| 2007/0229850 A1* | 10/2007 | Herber | 356/604 |
| 2008/0025190 A1 | 1/2008 | Yokoi et al. | |
| 2008/0186390 A1 | 8/2008 | Sato et al. | |
| 2008/0231729 A1 | 9/2008 | Sato et al. | |
| 2009/0161945 A1 | 6/2009 | Morgan-Mar et al. | |
| 2009/0304299 A1* | 12/2009 | Motomura et al. | 382/254 |
| 2010/0079618 A1 | 4/2010 | Sato et al. | |

FOREIGN PATENT DOCUMENTS

| | | |
|---|---|---|
| CN | 1910623 A | 2/2007 |
| CN | 101114469 | 1/2008 |
| JP | 10-222700 | 8/1998 |
| JP | 2001-189851 | 7/2001 |
| JP | 2003-223650 | 8/2003 |
| JP | 2005-522108 | 7/2005 |
| JP | 2006-31595 | 2/2006 |
| JP | 4077869 | 4/2008 |
| JP | 4082714 | 4/2008 |
| WO | 2005/078709 | 8/2005 |
| WO | 2006/033257 | 3/2006 |
| WO | 2007/108041 | 9/2007 |
| WO | 2007/139067 | 12/2007 |
| WO | 2007/139070 | 12/2007 |
| WO | 2008/026518 | 3/2008 |

OTHER PUBLICATIONS

J. Dong et al., "Super Resolution of 3D Surface Texture", International conference on computing intelligence and security workshops, 2007, pp. 279-282, IEEE, pp. 279-281; Figures 1-4.

A. A. Efros et al., "Texture Synthesis by Non-parametric Sampling", Computer Vision, 1999. The Proceedings of the Seventh IEEE International Conference on Kerkyra, Greece Sep. 20-27, 1999, Los Alamitos, CA, USA, IEEE Comput. Soc, US, vol. 2, Sep. 20, 1999, pp. 1033-1038.

W. T. Freeman et al., "Example-Based Super-Resolution", IEEE Computer Graphics and Applications, IEEE Service Center, New York, US, vol. 22, No. 2, Mar. 1, 2002, pp. 56-65.

Lee et al., "Mesh resolution augmentation using 3D skin bank", Computer Aided Design, Elsevier Publishers BV., Barking, GB, vol. 39, No. 7, Jun. 7, 2007.

O. G. Cula et al., "Skin Texture Modeling", International Journal of Computer Vision Kluwer Academic Publishers Netherlands, vol. 62, No. 1-2, Apr. 2005, pp. 97-119.

T. Chen et al., "Mesostructure from Specularity", Proceedings of the 2006 IEEE Computer Society Conference on Computer Vision and Pattern Recognition, 2006.

Y. Sato et al., "Object Shape and Reflectance Modeling from Observation", Proceedings of ACM, SIGGRAPH 97, pp. 379-387, 1997.

"Cook torrance shading model" in "Principles of Digital Image Synthesis", vol. 2, Morgan KaufmanInc., 1995.

S. K. Nayar et al., "Separation of Reflection Components Using Color and Polarization", International Journal of Computer Vision, No. 21, vol. 3, pp. 163-186, 1997.

V. Blanz et al., "A Morphable Model for the Synthesis of 3D faces", SIGGRAPH 1999.

M. W. Powell et al., "A Simple Strategy for Calibrating the Geometry of Light Sources", IEEE Transaction on pattern analysis and machine intelligence, vol. 23, No. 9, Sep. 2001.

J. T. Kajiya et al., "Rendering fur with three dimensional textures", SIGGRAPH, 1989, pp. 271-280.

S. Tokai et al., "A Method for Rendering Citrus Fruits with Computer Graphics", Journal of the Institute of Electronics, Information and Communication Engineers, J76-D-II, 8, pp. 1746-1754, Aug. 1993 (with partial English translation).

M. Okutomi, "Stereo Vision" in "Computer Vision: Technology Review and Future Directions", New Technology Communications, 1998 (with partial English translation).

Y. Takagi, "Stereoscopic display reconstructing texture by high-density directionality display" in "Stereoscopic Technology—Cutting edge of 3D Vision, 3D Display, Autostereography and their Applications—", NTS Inc., Oct. 10, 2008, pp. 209-221 (with partial English translation).

Office Action issued Jun. 15, 2012 in U.S. Appl. No. 13/000,743.

* cited by examiner

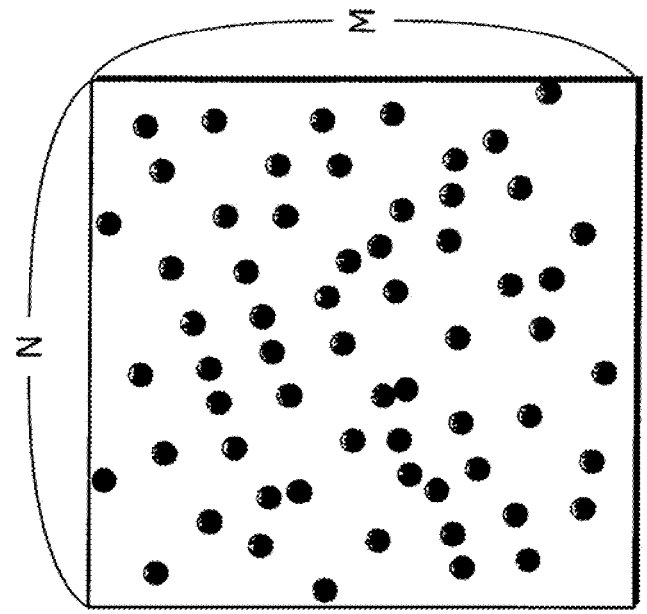
FIG. 5A
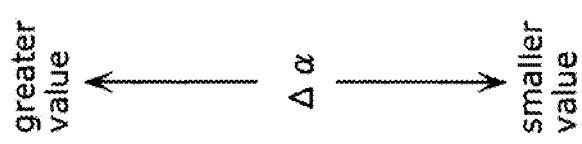
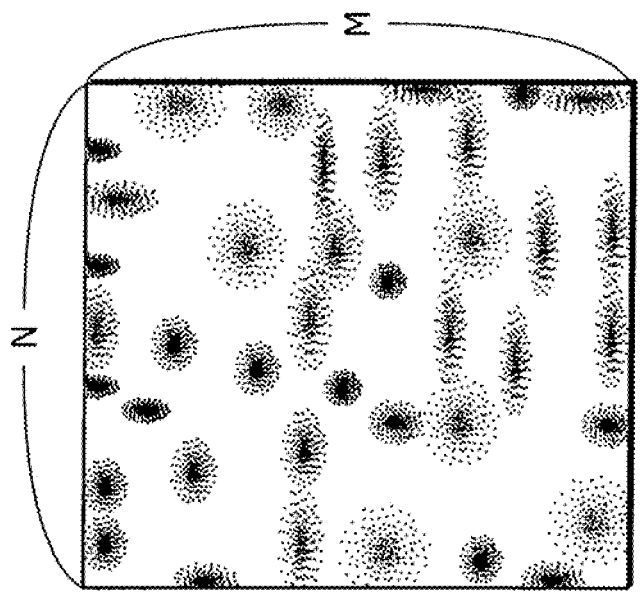
FIG. 5B
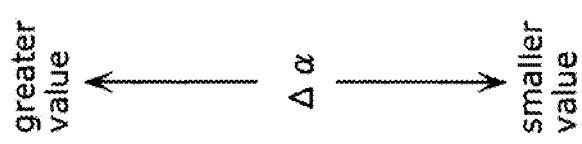

IMAGE GENERATION DEVICE AND IMAGE GENERATION METHOD

TECHNICAL FIELD

The present invention relates to image generation devices. More particularly, the present invention relates to a device that generates a high-quality image clearly showing a shape such as bumps on a surface of an object of the image by using a mesostructure of the shape, based on a geometric parameter regarding the shape which is generated from a low-quality image or the like of the same object, or that generates the image of the object under a pseudo light source emitting light from any desired position, while achieving the clear showing of the shape by using the mesostructure.

BACKGROUND ART

When an image of an object having a surface with bumps, such as a fruit, wood, or human skin, is captured by a low-quality image capturing device, or when the object has inadequate dimensions to be clearly image-captured, the bumps on the surface are often not shown in an image due to an insufficiency of resolution. Various solutions have been proposed to address this kind of problem. It is known from Patent Reference 1 to provide a method of (i) capturing a first image by a digital camera or the like and a higher-quality second image by zooming a portion of the first image, then (ii) learning a quality improvement function from a relationship between the first image and the second image, and (iii) applying the quality improvement function to the entire image. As a result, the entire image has higher quality and higher resolution. This method enables low-quality image capturing devices to generate an image with higher quality, reconstructing information of the bumps, which has been prevented from an insufficiency of resolution, using information generated from the second image.

Although the method disclosed in Patent Reference 1 achieves the image generation showing the bumps, the method fails image generation under a pseudo light source different from an actual light source. The image generation under a pseudo light source needs information regarding the shape of the surface of the object, more specifically, a geometric parameter regarding geometric normal of the object surface and a viewpoint. However, Patent Reference 1 does not disclose any method of estimating, from image data, a geometric parameter that is different from the image data. In the method of Patent Reference 1, the quality improvement function is assumed to be generated directly from the image data, although this method is not limited for image generation.

There is another method of generating a geometric parameter regarding a shape of an object using a range finder or the like, thereby obtaining a geometric parameter indicating a macro shape of the object. Unfortunately again, this method has problems in resolution and fineness. Reconstruction of fine-scale bumps on a surface of an object, such as fruit, wood, or human skin, needs highly complicated functions in a used device, which results in unrealistic size and cost especially in terms of usability.

On the other hand, Patent Reference 2 discloses a method capable of generating an image showing bumps on a surface of an object, and also capable of estimating, from image data, a geometric parameter that is not the image data itself but information regarding a geometric normal of the object surface. In the technique disclosed in Patent Reference 2, Torrance-Sparrow model indicating respective physical relationships between pixel values and geometric parameters regarding a viewpoint position, a light source position, and a geometric normal of the object surface is applied to an image of the object. Then, each difference between the result and an actual measurement value is modeled using Gaussian distribution. Here, the components modeled by Gaussian distribution can be considered as components having higher resolution. Therefore, addition of the components modeled by Gaussian distribution to an image without information of bumps on a surface of the object enables the image to show the bumps. Moreover, the use of the geometric parameter regarding a viewpoint position, a light source position, and a geometric normal of an object surface makes it possible to generate an image under a pseudo light source.

PRIOR ARTS

Patent References

[Patent Reference 1] US Patent Application Publication No. 2006/0003328A1
[Patent Reference 2] Japanese Unexamined Patent Application Publication No. 2006-31595

SUMMARY OF INVENTION

Problems that Invention is to Solve

Unfortunately, the technology disclosed in Patent Reference 2 does not use information with medium level details regarding a shape of a surface such as bumps of especially fruits, wood, or human skin (Hereinafter, the information of the shape with medium level details is referred to as a "mesostructure"). Therefore, this conventional technology fails to generate an image more clearly showing the shape. The reason of the failure is given below. In the mesostructure, it can be considered that bumps having a spatial structure with medium level details are spatially distributed at random, as described in Non Patent Reference 1. The Gaussian model disclosed in Patent Reference 2 is, however, generated by modeling variations of pixel values according to a relationship between each pixel and the geometric parameter. Therefore, the technology disclosed in Patent Reference 2 cannot show the bumps having a spatial structure with medium level details, but merely shows a homogeneous rough surface or the like. As a result, when fruits, wood, or human skin is image-captured as an object, a surface of the object is seen to have a homogeneous rough surface that is different from the imaged generated by using mesostructure.

Thus, the present invention overcomes the problems of the conventional techniques as described above. It is an object of the present invention to provide an image generation device and an image generation method that are capable of generating an image of an object (i) with high quality more clearly showing a shape of a surface of the object by using a mesostructure of the shape and also (ii) under a pseudo light source emitting light from any desired position, based on a geometric parameter regarding the shape which is generated from a low-quality image of the object.

[Non Patent Reference 1] "Mesostructure from Specularity", Tongbo Chen, Michael Goesele, and Has-Peter Seidel; Proceedings of the 2006 IEEE Computer Society Conference on Computer Vision and Pattern Recognition, 2006

Means to Solve the Problems

In accordance with an aspect of the present invention for achieving the object, there is provided an image generation device that generates, based on information regarding a shape of a surface of an object, a high-quality image of the object more clearly showing the shape, the object of the high-quality image being illuminated by a light source and viewed from a viewpoint, the image generation device including: an information obtainment unit configured to obtain position information of the light source, position information of the viewpoint, and geometric normal information regarding the shape; a geometric parameter calculation unit configured to calculate a first geometric parameter regarding the shape, by performing a predetermined arithmetic operation using the position information of the light source, the position information of the viewpoint, and the geometric normal information, for each point of the surface corresponding to a pixel in the high-quality image; a high-resolution database unit in which an exemplum is stored, the exemplum being a geometric parameter that indicates a mesostructure of a portion of the surface and has a spatial resolution higher than a spatial resolution of the geometric normal information; an exemplum expansion unit configured to read out the exempla from the high-resolution database unit, and spatially increase the readout exempla so that a spatial region indicated by the readout exempla covers surface of the object in the high quality image; a geometric parameter modification unit configured to calculate a modified geometric parameter, by modifying the first geometric parameter using the region expanded by the exemplum expansion unit; and an image generation unit configured to calculate a pixel value of the each point by applying the modified geometric parameter to a reflection model for deciding the pixel value, and thereby generate the high-quality image.

With the above structure, the geometric parameter regarding the surface of the object is modified to have a higher resolution, and then the modified geometric parameter is used to generate a higher-quality output image. In addition, the geometric parameter indicates position information of a light source, and such a geometric parameter is applied to a reflection model to generate an image. This allows the light source to be virtually arranged at any desired position, which makes it possible to generate the image of the object under a pseudo light source emitting light from any desired position.

It should be noted that the present invention can be realized not only as the above image generation device, but also as: an image generation method including steps performed by the characteristic units of the image generation device: a program causing a computer to execute the characteristic steps of the image generation method; a computer-readable recording medium, such as a CD-ROM, in which the program is recorded; and the like.

Effects of the Invention

Accordingly, the present invention can generate an image of an object (a) with high quality more clearly showing a shape such as bumps on a surface of the object by using a mesostructure of the shape and also (b) under a pseudo light source emitting light from any desired position, based on a geometric parameter regarding the shape which is generated from a low-quality image of the object.

With the technology of the present invention, a resolution of an image captured by a digital camera or the like can be increased, and a pseudo image under a light source at a desired position can be generated. Therefore, the present invention is highly suitable for practical use in recent days digital cameras, security cameras, and the like have been widely used.

BRIEF DESCRIPTION OF DRAWINGS

FIG. 5A is a schematic diagram showing one example of an exemplum map according to the first embodiment of the present invention.

FIG. 5B is a schematic diagram showing one example of an exemplum map of the prior art.

Figure 1:
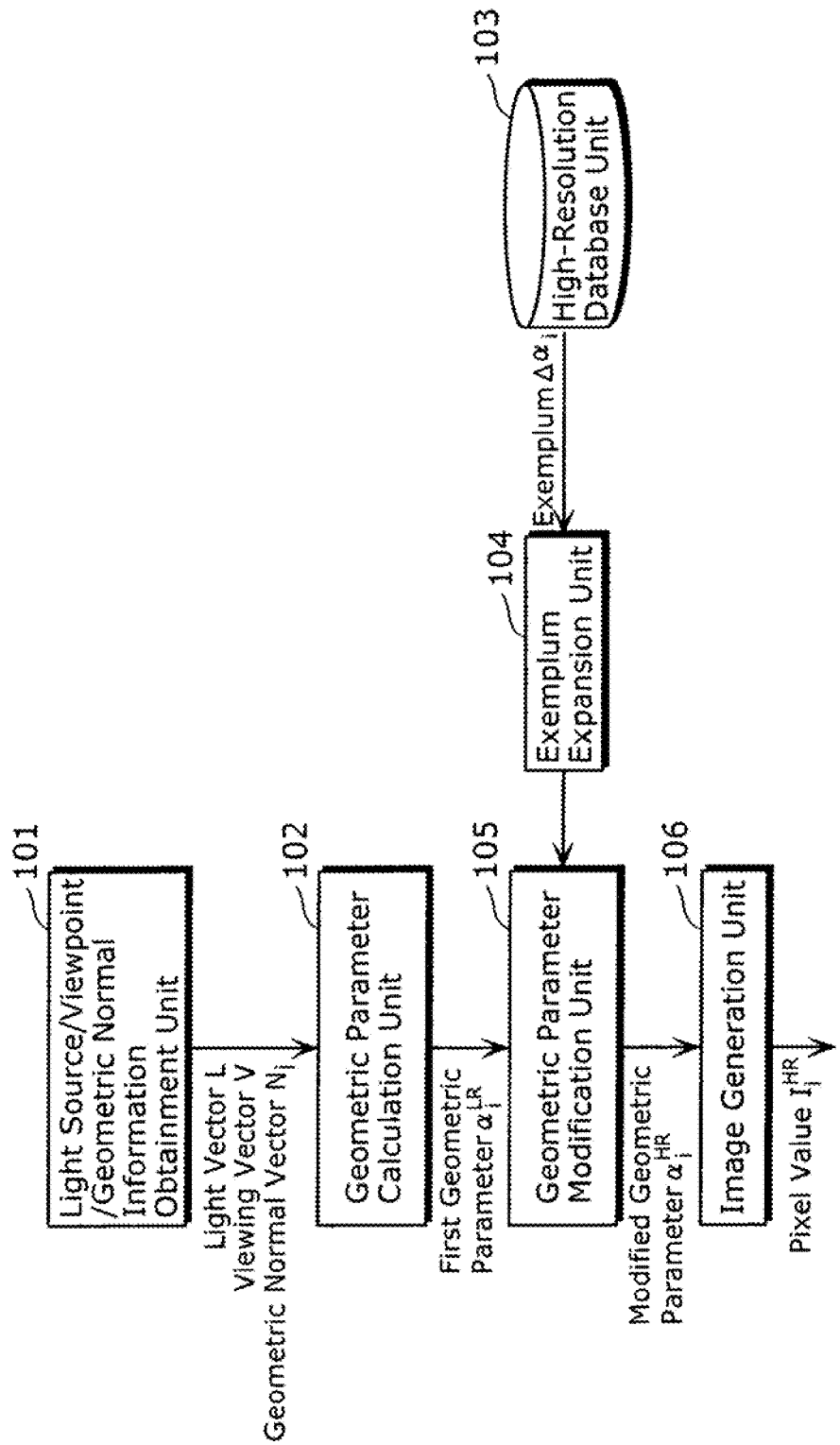
FIG. 1 is a diagram showing a basic structure of an image generation device according to a first embodiment of the present invention.

NUMERICAL REFERENCES 101, 101a light source/viewpoint/geometric normal information obtainment unit
102 geometric parameter calculation unit
103 high-resolution database unit
104, 104a exemplum expansion unit
105 geometric parameter modification unit
106, 106a image generation unit
601 first image capture unit
602 second image capture unit
603 second geometric parameter estimation unit
604 exemplum generation unit
1010 light source position change unit
1201 DS separation unit
1202 diffuse reflection image processing unit
1901 exemplum conformity expansion unit
2301 image capturing unit
2302 shape reconstruction unit
2303 geometric normal estimation unit
2304 light source information generation unit
2305 light source information conversion unit
2306 viewpoint information generation unit
2307 viewpoint conversion unit
2308 DS separation unit
2309 specular reflection image mesostructure extraction unit

DETAILED DESCRIPTION OF THE INVENTION

An aspect of the present invention is an image generation device that generates, based on information regarding a shape of a surface of an object, a high-quality image of the object more clearly showing the shape, the object of the high-quality image being illuminated by a light source and viewed from a viewpoint, the image generation device including: an information obtainment unit configured to obtain position information of the light source, position information of the viewpoint, and geometric normal information regarding the shape; a geometric parameter calculation unit configured to calculate a first geometric parameter regarding the shape, by performing a predetermined arithmetic operation using the position information of the light source, the position information of the viewpoint, and the geometric normal information, for each point of the surface corresponding to a pixel in the high-quality image; a high-resolution database unit in which an exemplum is stored, the exemplum being a geometric parameter that indicates a mesostructure of a portion of the surface and has a spatial resolution higher than a spatial resolution of the geometric normal information; an exemplum expansion unit configured to read out the exempla from the high-resolution database unit, and spatially increase the readout exempla so that a spatial region indicated by the readout exempla covers surface of the object in the high quality image; a geometric parameter modification unit configured to calculate a modified geometric parameter, by modifying the first geometric parameter using the region expanded by the exemplum expansion unit; and an image generation unit configured to calculate a pixel value of the each point by applying the modified geometric parameter to a reflection model for deciding the pixel value, and thereby generate the high-quality image. With the above structure, high-resolution components to be used to reconstruct mesostructure are held as exempla in a database, and then the exempla are increased to spatially expand a region (hereinafter, referred to also as an "exemplum map") indicated by the exempla. Thereby, the image generation device according to the present invention can generate a high-quality image of the object more clearly showing a shape such as bumps on a surface of the object by using a mesostructure of the shape, based on information regarding the shape which is generated from a low-quality image of the same object. In addition, (i) a geometric parameter calculated from geometric normal information of each point of the object surface, (ii) position information of a light source, and (iii) position information of a viewpoint are applied to a reflection model to generate an image, which makes it possible to set the position of the light source to any desired position. Thereby, the image generation device according to the present invention can generate the image of the object under a pseudo light source emitting light from a desired position.

Furthermore, an example of the geometric parameter is a value of an angle between (i) a half vector generated by adding a unit vector indicating a direction of the light source with a unit vector indicating a direction of the viewpoint and (ii) a geometric normal vector of a point corresponding to the first geometric parameter.

Here, it is preferable that the information obtainment unit is configured to obtain the geometric normal information, by calculating the geometric normal information from the information which is generated by one of a stereo camera, a range finder, and another shape detection device which capture an image of the object. With the above structure, the generation of the first geometric parameter using a stereo camera, a range finder, or another shape detection means realizes generation of a geometry information indicating a macrostructure such as a gross shape of the entire image of the object. The exempla equivalent to separately-obtained high-resolution components are increased to expand an exemplum map to cover the overall object. Thereby, the image generation device according to the present invention can generate a high-quality image of the object clearly showing a shape such as bumps on a surface of the object by using the mesostructure. In addition, while clearly showing the shape such as bumps by using the mesostructure, it is possible to generate an image of the object under a pseudo light source emitting light from any desired position.

It is still preferable that the reflection model is a mathematical expression for calculating a pixel value of a point in the high-quality image using the geometric normal information, the position information of the viewpoint, and a geometric parameter which are regarding the point, and that the image generation unit is configured to calculate the pixel value of the each point, by applying, to the reflection model, the geometric normal information and the position information of the viewpoint which are obtained by the information obtainment unit in addition to the modified geometric parameter. With the above structure, a parameter of the reflection model regarding the position of the light source can be changed. Thereby, the image generation device according to the present invention can generate an image of the object under a pseudo light source emitting light from any desired position, while clearly showing a shape such as bumps on a surface of the object by using the mesostructure.

It is still preferable that the image generation device further includes a first image capture unit configured to generate a first image, by capturing an image of the object; a second image capture unit configured to generate a second image, by capturing an image of a portion of the object with a resolution higher than a resolution of the first image, the portion corresponding to a highlight region of the first image to have higher quality in the high-quality image; a second geometric parameter estimation unit configured to estimate a second geometric parameter using as an objective function a pixel value of the second image generated by the second image capture unit, the second geometric parameter indicating the shape of the surface of the object; and an exemplum generation unit configured to set the second geometric parameter estimated by the second geometric parameter estimation unit to the exemplum, and store the exemplum into the high-resolution database unit. With the above structure, an image corresponding to the highlight region is captured to have high quality, and from the resulting image, a geometric parameter capable of indicating the mesostructure is estimated. Thereby, it is possible to generate a high-quality image of the object more clearly showing a shape such as bumps on a surface of the object by using the mesostructure, based on information regarding the shape which is generated from the low-quality object.

It is still preferable that the second image capture unit is configured to generate the second image, by capturing an image of the portion to be zoomed more than the capturing of the first image. With the above structure, use of a camera having a zooming function makes it possible to utilize a system simpler than a system including two cameras, in order to generate a high-quality image of the object more clearly showing a shape such as bumps on a surface of the object by using the mesostructure. In addition, while clearly showing the shape such as bumps by using the mesostructure, it is possible to generate an image of the object under a pseudo light source emitting light from any desired position.

It is still preferable that the information obtainment unit is configured to obtain plural pieces of the position information of the light source, that the geometric parameter calculation unit is configured to calculate the first geometric parameter for each of the plural pieces of the position information of the light source obtained by the information obtainment unit; that the geometric parameter modification unit is configured to calculate the modified geometric parameter for each of the plural pieces of the position information of the light source obtained by the information obtainment unit; and that the image generation unit is configured to generate the high-quality images for the plural pieces of the position information of the light source obtained by the information obtainment unit, respectively. With the above structure, for each of changing positions of the light source, the first geometric parameter is calculated, then the modified geometric parameter is calculated, and eventually the image is generated. Thereby, while clearly showing the shape of the surface such as bumps by using the mesostructure, it is possible to generate a plurality of consecutive images of the object under pseudo light sources emitting light from any desired positions.

It is still preferable that the image generation device further includes a first image capture unit configured to generate a first image, by capturing an image of the object; and a separation unit configured to separate the first image generated by the first image capture unit into specular reflection components and diffuse reflection components, wherein the geometric parameter calculation unit, the exemplum expansion unit, the geometric parameter modification unit, and the image generation unit perform the calculating of the first geometric parameter, the reading out and the increasing, the calculating of the modified geometric parameter, and the calculating of the pixel value and the generating, respectively, for the specular reflection components separated by the separation unit, and the image generation unit is configured to further synthesize (i) an image using the high-quality specular reflection components generated by the image generation unit with (ii) an image using the diffuse reflection components separated by the separation unit. With the above structure, the input image is separated into diffuse reflection components and specular reflection components, and the reflection model is applied to the specular reflection components to increase quality of the image. This means that the reflection model is applied only to image components for which the reflection model is originally to be applied (namely, specular reflection components). Thereby, it is possible to generate a high-quality image of the object more correctly and clearly showing a shape such as bumps on a surface of the object by using the mesostructure. In addition, while clearly showing the shape such as bumps by using the mesostructure, it is possible to generate an image of the object under a pseudo light source emitting light from any desired position.

It is still preferable that the exemplum expansion unit includes an exemplum conformity expansion unit configured to spatially increase the readout exempla with specular reflection, keeping a correlation between the specular reflection components and the diffuse reflection components separated by the separation unit. With the above structure, the mesostructure with specular reflection is expanded having integrity using correlation with diffuse reflection image. As a result, when, for example, the light source is changed, reality of the state of the reflection on the surface is more enhanced.

It is still preferable that the image generation device further including an exemplum generation unit configured to obtain computer graphics data indicating the shape of the surface, generate the exemplum from the computer graphics data, and store the exemplum into the high-resolution database unit. With the above structure, it is possible to generate a high-quality image of the object more clearly showing a shape such as bumps on a surface of the object by using artificially generated data, based on information regarding the shape which is generated from a low-quality image of the object.

Another aspect of the present invention is an image generation device that generates a high-quality image by changing a position of a light source and a viewpoint for an original image generated by imaging an object to a different position and a different viewpoint, respectively, in order to reconstruct reflection on a mesostructure in the original image, the object in the high-quality image being seen as illuminated from the different position and viewed from the different viewpoint, the image generation device including: an image capturing unit configured to generate the original image by imaging the object; a light source information generation unit configured to generate light source information indicating the position of the light source; a light source information conversion unit configured to convert the light source information to different light source information so that the position is changed to the different position; a shape reconstruction unit configured to hold shape data indicating a shape of a surface of the object; a geometric normal estimation unit configured to generate a geometric normal of the object based on the shape data held by the shape reconstruction unit; a viewpoint information generation unit configured to determine the viewpoint that is a position of a camera imaging the object; a viewpoint conversion unit configured to change the shape data held by the shape reconstruction unit and change the viewpoint determined by the viewpoint information generation unit to the different position; a DS separation unit configured to separate the original image captured by the image capturing unit into a specular reflection image and a diffuse reflection image; a geometric parameter calculation unit configured to calculate a geometric parameter indicating the shape of the surface of the object, by performing a predetermined arithmetic operation for each point on the surface using the light source information, the viewpoint, and the geometric normal, the each point corresponding to a corresponding pixel in the high-quality image; a specular reflection image mesostructure extraction unit configured to extract an exemplum from the specular reflection image separated by the DS separation unit, the exemplum being a geometric parameter indicating the mesostructure; an exemplum conformity expansion unit configured to increase the exemplum extracted by the specular reflection image mesostructure extraction unit so that a spatial region indicated by the exemplum covers the surface of the object in the high quality image, keeping a correlation between the exemplum and the diffuse reflection image separated by the DS separation unit; a geometric parameter modification unit configured to calculate a modified geometric parameter, by modifying the geometric parameter calculated by the geometric parameter calculation unit, using the region expanded by the exemplum conformity expansion unit; and an image generation unit configured to generate the high-quality image by calculating a pixel value of the each point by applying the modified geometric parameter to a reflection model for deciding the pixel value. It is preferable that texture of specular reflection of a hair or a lip is reconstructed as the mesostructure using the reflection model, when the position of the light source and the viewpoint are changed to the different position and the different viewpoint for the original image of the object that is a human head, the original image being imaged from the viewpoint that is a predetermined position. With the above structure, the appearance and the object and the value of brightness of the surface of the object are varied in each of the situations where the light source varies and where a line of sight varies. Thereby, the mesostructure which is quite sensitive to image capturing conditions is reconstructed, and the reality of the resulting image is enhanced. In addition, the above idea of the mesostructure can achieve varying specular reflection as a viewpoint varies, which has been impossible in the prior arts. As a result, reality can be achieved in the resulting image.

The following describes embodiments according to the present invention with reference to the drawings.

FIRST EMBODIMENT

Firstly, an image generation device and an image generation method according to the first embodiment of the present invention are described. FIG. 1 is a diagram showing a structure of the image generation device according to the first embodiment of the present invention. The image generation device of FIG. 1 generates a high-quality image of an object more clearly showing a shape such as bumps on a surface of the object by using a mesostructure of the shape, based on information regarding the shape which is generated from a low-quality image of the object. In order to achieve the above generation of the high-quality image, the image generation device of FIG. 1 holds high-resolution components to be used to reconstruct the mesostructure, as exempla, in a database, and spatially increases the exempla to expand an exemplum map. The image generation device of FIG. 1 includes a light source/viewpoint/geometric normal information obtainment unit 101, a geometric parameter calculation unit 102, a high-resolution database unit 103, an exemplum expansion unit 104, a geometric parameter modification unit 105, and an image generation unit 106. Here, the object of the image generated by the image generation device is assumed to be illuminated from a certain light source and viewed from a certain viewpoint.

The light source/viewpoint/geometric normal information obtainment unit 101 obtains (i) position information of the light source and (ii) position information of a camera or position information of the viewpoint regarding the image generation device, and calculates (iii) information of a geometric normal (hereinafter, referred to also as "geometric normal information") of a surface of the object (hereinafter, referred to as an "object surface") from information obtained by a range finder, a stereo camera, or the like.

The geometric parameter calculation unit 102 calculates a geometric parameter indicating a macrostructure such as a gross shape of the object (in other words, the geometric parameter is generated from a low-quality image of the object), from the position information of the light source, the position information of the viewpoint, and the geometric normal information which have been obtained by the light source/viewpoint/geometric normal information obtainment unit 101. Here, it can be assumed that the generated parameter does not have enough resolution to reconstruct the mesostructure.

The high-resolution database unit 103 is a database in which exempla are stored. Each of the stored exempla is a different high-quality geometric parameter that indicates a mesostructure of a portion of the object surface and has a spatial resolution higher than a spatial resolution of the geometric normal information calculated by the light source/viewpoint/geometric normal information obtainment unit 101. In the first embodiment, the high-quality geometric parameters corresponding to the high-resolution components including the mesostructure components of the image are held as the exempla in a two-dimensional block form that is an exemplum map. Here, the exemplum map is not limited to a square or a rectangular.

The exemplum expansion unit 104 reads out the exempla from the high-resolution database unit 103, and then increases the readout exempla in order to expand a spatial region (exemplum map) indicated by the readout exempla to cover the object surface. In the first embodiment, the dimensions of the exemplum map is spatially expanded to fill the dimensions of the output image, or the dimensions of a target region of the object. Thereby, even if the dimensions of the exemplum map is smaller than the dimensions of the image, the mesostructure can be reconstructed over the entire image.

The geometric parameter modification unit 105 modifies the geometric parameter calculated by the geometric parameter calculation unit 102, by adding the geometric parameter with information indicating the high-resolution component having the mesostructure component spatially expanded by the exemplum expansion unit 104. This means that, the information indicating the mesostructure components are added even to the geometric parameters that have been calculated by the geometric parameter calculation unit 102 and do not indicate the mesostructure due to an insufficient resolution of the range finder, a stereo camera, or the like.

The image generation unit 106 calculates a pixel value of each point of the output image, using the modified geometric parameter for a reflection model that is a relational expression for deciding the pixel value from the modified geometric parameter, thereby generating the output image to have higher quality including the mesostructure components.

With the above structure, the image generation device according to the first embodiment can generate a high-quality image including mesostructure components, even from a low-quality input image that does not include the mesostructure components.

It should be noted that the elements included in the image generation device (namely, the geometric parameter calculation unit 102, the high-resolution database unit 103, the exemplum expansion unit 104, the geometric parameter modification unit 105, and the image generation unit 106) can be realized as software such as a program that is executed in a computer having a central processing unit (CPU), a random access memory (RAM), a read-only memory (ROM), a communication interface, an input/output port, a hard disk, a display, and the like, or can be realized as a hardware such as an electronic circuit. The same goes for image generation devices according to other embodiments of the present invention.

Figure 2:
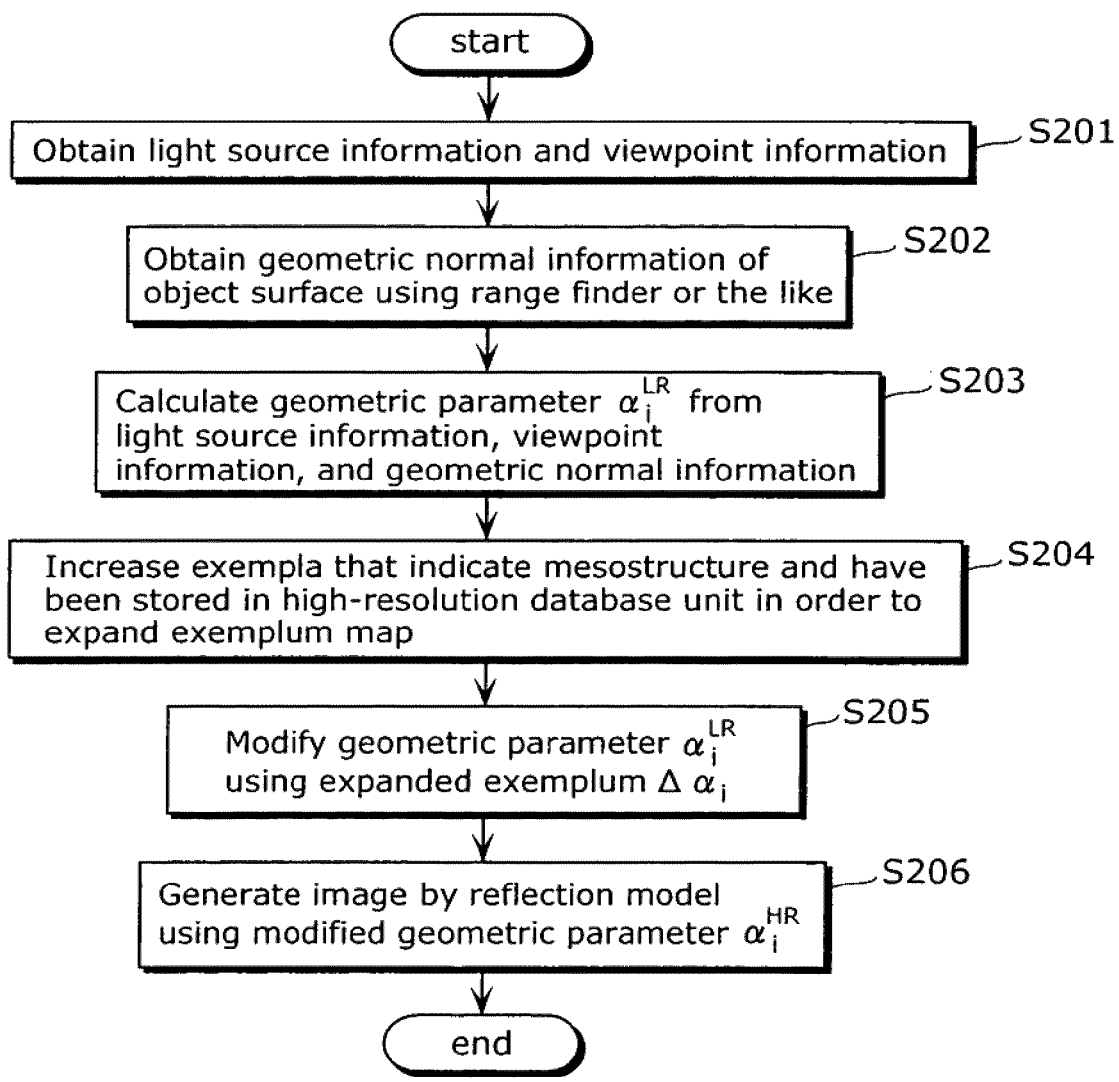
FIG. 2 is a flowchart showing basic processing performed by the image generation device according to the first embodiment of the present invention.
Figure 3:
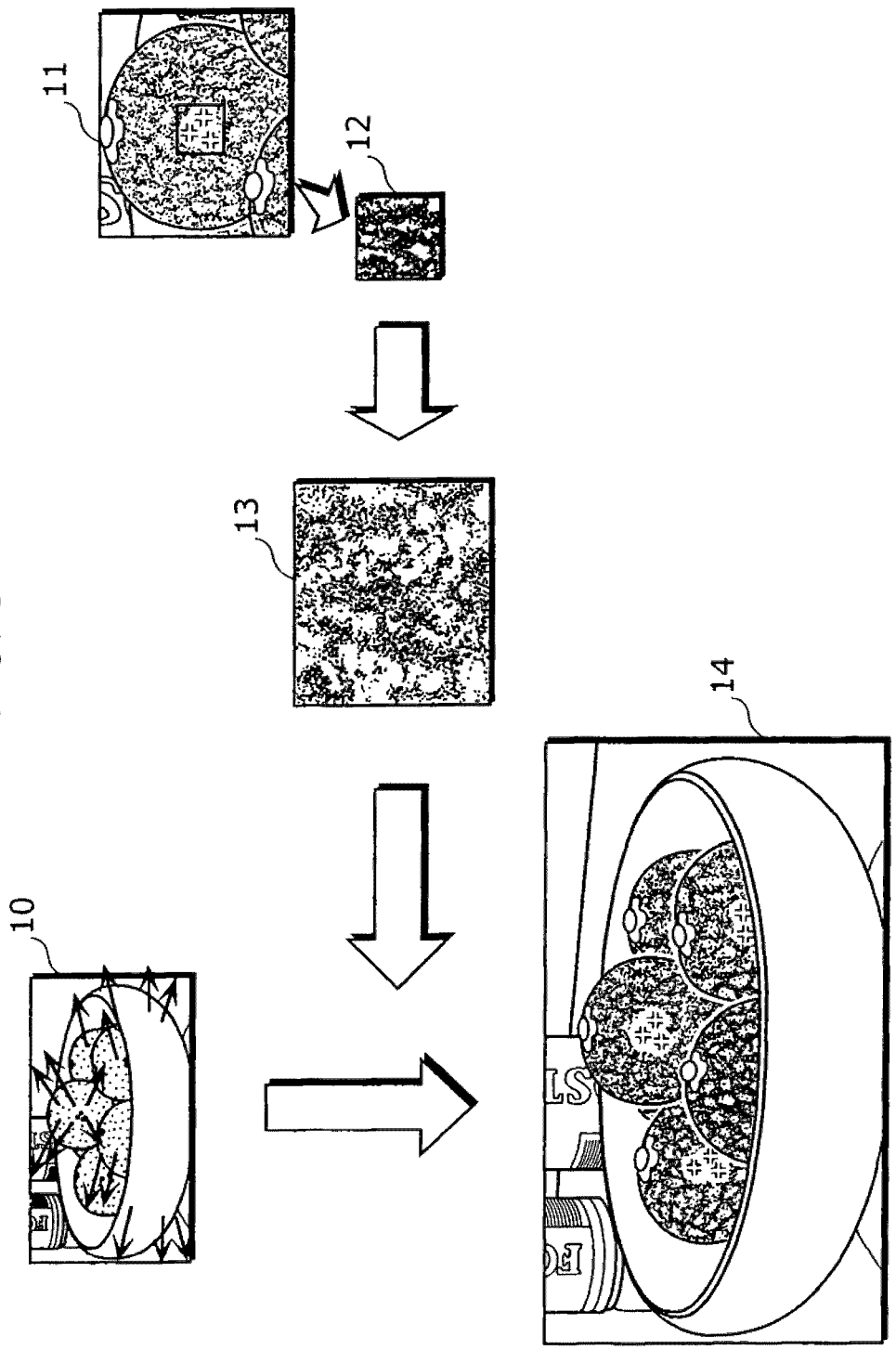
FIG. 3 is a schematic diagram showing information and an image generated by the image generation device according to the first embodiment of the present invention.

The following describes processing performed by the image generation device having the above structure according to the first embodiment of the present invention (namely, an image generation method according to the first embodiment), with reference to a flowchart of FIG. 2 and schematic diagrams of information and images of FIG. 3. In the image generation method according to the first embodiment, a high-quality image of an object more clearly showing a shape such as bumps on a surface of the object is generated based on information regarding the shape which is generated from a low-quality image of the object.

Firstly, at Step S201, the light source/viewpoint/geometric normal information obtainment unit 101 obtains (i) a light vector L from a position of a setting light source, and (ii) a viewing vector V from a position of a setting camera. Here, the viewing vector, the light vector, and a below-described geometric normal information regarding a shape of a surface of an object may be artificially generated with computer graphics (CG) or the like, as far as they can be obtained. If they are such artificial data, the following Step S201 and S202 are eliminated.

Next, at Step S202, the light source/viewpoint/geometric normal information obtainment unit 101 calculates geometric normal information (refer to geometric normal information 10 in FIG. 3) regarding a surface of the object, from information obtained by a stereo camera, a range finder, or the like.

More specifically, when a stereo camera is used, a 3-dimensional position of each point of the object surface is determined from two images using a method disclosed in Non Patent Reference 2. Next, a geometric normal vector $N_i$ at a point i on the object surface is calculated from at least three 3-dimensional positions A, B, and C, using the following Equation 1.

[Equation 1]

$$N_i = \vec{AB} \times \vec{AC} \qquad \text{(Equation 1)}$$

where × represents an outer product. Of course, as far as the geometric normal vector regarding the shape of the surface can be calculated, the method of calculating the geometric normal information is not limited to the above.

[Non Patent Reference 2] "Computer Vision: Technology Review and Future Directions", Takashi Matsuyama, Yoshinori Kuno, and Jyun Imiya, New Technology Communications, pp. 123-133, 1998

On the other hand, when a range finder is used, a geometric normal vector $N_i$ on the object surface can be calculated using a method disclosed in Non Patent Reference 3.

[Non Patent Reference 3] "Object Shape and Reflectance Modeling from Observation", Yoichi Sato, Mark D. Wheeler, and Katsushi Ikeuchi, Proceedings of ACM, SIG-GRAPH 97, pp. 379-387, 1997

Figure 4:
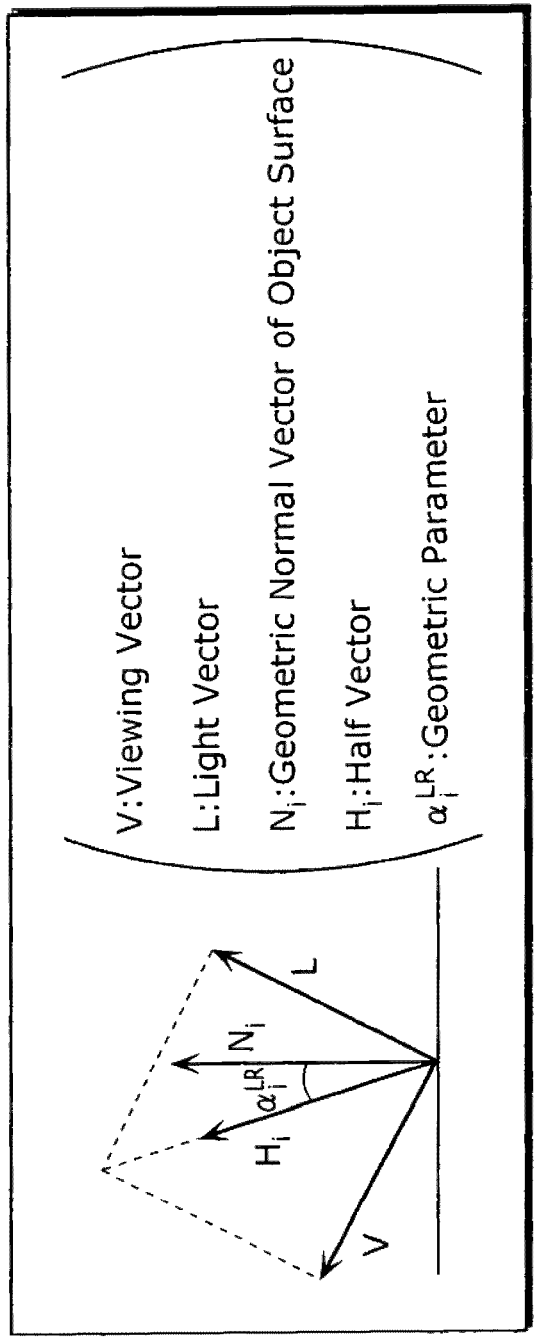
FIG. 4 is a graph showing one example of a geometric parameter according to the first embodiment of the present invention.

Next, at Step S203, the geometric parameter calculation unit 102 calculates a geometric parameter regarding the shape of the surface from the position information of the light source, the position information of the viewpoint, and the geometric normal information which have been obtained by the light source/viewpoint/geometric normal information obtainment unit 101. This geometric parameter directly influences a brightness value of the output image. Therefore, the geometric parameters can be used to change respective pixel values depending on the shape such as mesostructure of the surface of the object. As shown in FIG. 4, if a position of the light source and a position of the viewpoint are known, the geometric parameter $\alpha_i^{LR}$ regarding the shape of the surface of the object is calculated from the viewing vector V and the light vector L which have been obtained at Step S201, using the following Equation 2.

[Equation 2]

$$\alpha_i^{LR} = \arccos(N_i \cdot H) \qquad \text{(Equation 2)}$$

Here, H is determined by the following Equation 3. In Equation 3, it is assumed that the viewing vector V and the light vector L are away from the object enough not to depend on a point i on the object surface.

[Equation 3]

$$H = \frac{0.5(L+V)}{\|0.5(L+V)\|} \qquad \text{(Equation 3)}$$

As obvious from the above Equations 2 and 3, this geometric parameter is a value (accoos) of an angle between (i) a half vector generated by adding a unit vector indicating a direction of the light source with a unit vector indicating a direction of the viewpoint and (ii) a geometric normal vector of a point corresponding to the geometric parameter.

As described above, the geometric parameter calculation unit 102 calculates the geometric parameter $\alpha_i^{LR}$ regarding the shape of the surface of the object, for each point i on the output image. Here, the generated geometric parameter $\alpha_i^{LR}$ does not indicate the mesostructure, since the information regarding the shape which is obtained by a range finder, a stereo camera, or the like and then used to generate the geometric parameter $\alpha_i^{LR}$ has a low resolution or low fineness. It should be note that lowpass filtering may be spatially applied to the calculated geometric parameter $\alpha_i^{LR}$ in order to cancel noise.

Next, at Step S204, since the exempla of the exemplum map (refer to a high-resolution image 11 and an exemplum map 12 in FIG. 3) have previously been stored in the high-resolution database unit 103, the exemplum expansion unit 104 reads out the exempla from the high-resolution database unit 103, and increases the readout exempla to spatially expand the exemplum map indicated by the readout exempla (refer to an expanded exemplum map 13 in FIG. 3). Here, each of the exempla is a high-quality geometric parameter that indicates the mesostructure of a portion of the object surface. The high-quality geometric parameter has a spatial resolution higher than a spatial resolution of the geometric normal information calculated by the light source/viewpoint/geometric normal information obtainment unit 101. In the first embodiment, the exempla are referred to as geometric parameters $\Delta\alpha_i$ that indicate not pixel values but high-resolution components having the mesostructure components in an exemplum map having dimensions of N×M, as shown in FIG. 5A. It should be noted that the dimensions of the exemplum map may be smaller than the dimensions of the input image. In FIG. 5A, a darker portion shows a greater value of the geometric parameter $\Delta\alpha_i$. In the technique disclosed in Patent Reference 2, the information of the shape of the surface such as bumps is indicated by distribution of points using Gaussian model. Therefore, the technique disclosed in Patent Reference 2 indicates the bump information merely by existence of points as shown in FIG. 5B, but fails to indicate a structure (consecution) having the spatial dimensions of the image of the object, such as mesostructure. However, the first embodiment of the present invention can solve the above problem of the conventional technology, indicating the mesostructure by the exemplum map in a two-dimensional map having dimensions of N×M. It should be noted that the exempla may be previously obtained by a method described later in the second embodiment and then stored into the high-resolution database unit 103, or may be artificially generated with computer graphics. The method of artificially generating mesostructure with computer graphics model is disclosed in Non Patent Reference 4.

[Non Patent Citation 4] "A Method for Rendering Citrus Fruits with Computer Graphics", Shogo Tokai, Makoto Miyagi, Takami Yasuda, Shigeki Yokoi, and Jun-ichiro Toriwaki, Journal of the Institute of Electronics, Information and Communication Engineers, J76-D-II, 8, pp. 1746-1754, 1993

Next, when the dimensions of the exemplum map is smaller than the dimensions of the output image or the dimensions of the object, the exemplum map as shown in FIG. 5A is spatially expanded to fill the dimensions of the output image. It should be noted that the exempla may be increased in order to expand the exemplum map to fill the dimensions of a target region of the object, when the target region is known. For example, the image generation device may further include a processing unit of receiving an input image in addition to the light source/viewpoint/geometric normal information obtainment unit 101, and when color of the object is known the input image is segmented based on a color feature amount to specify a region of the object. Even if there is no such a processing unit of receiving the input image, consecution of the geometric normal information of the object is detected to estimate the region. Thereby, it is possible to increase the exempla to expand the exemplum map over the region. The above description has been given assuming that the entire object is covered with homogeneous mesostructure. However, if the object is made of two different kinds of materials, exempla may be increased in order to expand an exemplum map to cover a region of a corresponding target material using a physical value (for example, a parameter m in Equation 8 as described below) indicating a difference in the materials. The increase of exempla for spatial expansion of the exemplum map is performed by increasing components of the mesostructure in the exemplum map to cover the entire object or the entire image. Therefore, the increase of exempla needs keeping of spatial statistical characteristics of geometric parameters $\Delta\alpha_i$ indicating high-resolution components including the mesostructure in the exemplum map. Here, the spatial statistical characteristics mean a dispersion state of spatial arrangements of mesostructure components that are information having medium level details regarding the shape of the surface such as bumps. The method of the exempla increase while keeping the spatial statistical characteristics of the geometric parameters $\Delta\alpha_i$ indicating high-resolution components including mesostructure is disclosed in Non Patent Reference 5.

[Non Patent Reference 5] "Texture Synthesis by Nonparametric Sampling" Alexei A Efros and Thomas K Leung, IEEE International Conference on Computer Vision, 1999

Figure 6:
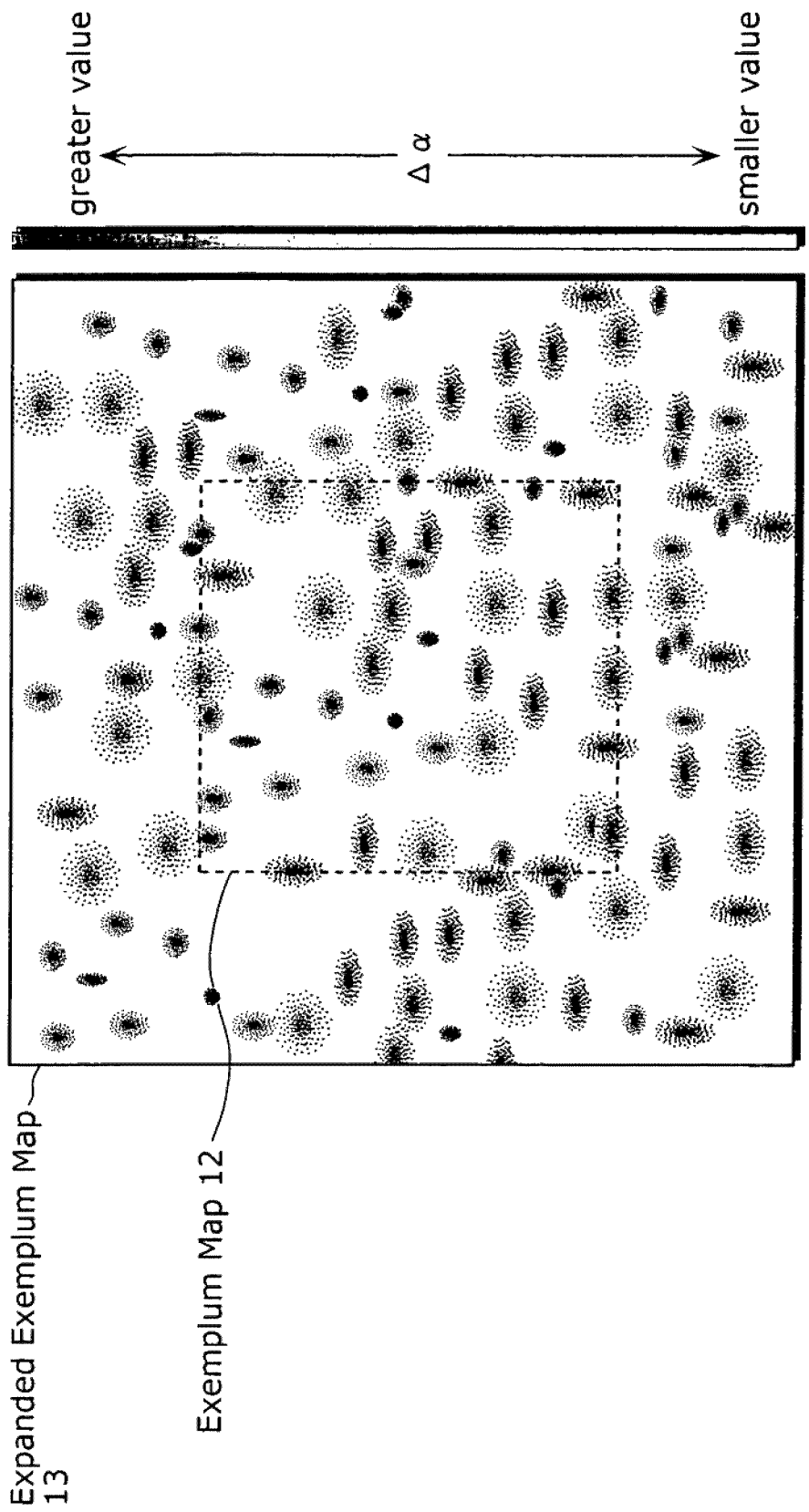
FIG. 6 is a schematic diagram showing one example of an expanded exemplum map according to the first embodiment of the present invention.

The technique disclosed in Non Patent Reference 5 can achieve the spatial expansion so that the increased exempla of the expanded exemplum map has the same characteristics as the original exempla, as shown in FIG. 6. Although in the technique of Non Patent Reference 5 an image is expanded based on a spatial distribution of pixel values in a small region, the image generation device according to the first embodiment is characterized in increasing geometric parameters (exempla) $\Delta\alpha_i$ indicating high-resolution components including the mesostructure in order to spatially expand the exemplum map indicated by the exempla, based on spatial distribution of the geometric parameters $\Delta\alpha_i$. The conventional image expansion based on pixel values cannot achieve image generation under a pseudo light source, due to direct influence of a position of a real-world light source. On the other hand, in the present invention, the use of the geometric parameters $\Delta\alpha_i$ indicating high-resolution components including the mesostructure makes it possible to change respective brightness values of the output image depending on a position of a pseudo light source. Thereby, while eliminating influence of the real-world light source, the image generation device according to the first embodiment can generate images under respective pseudo light sources.

Next, at Step S205, the geometric parameter modification unit 105 modifies the geometric parameter $\alpha_i^{LR}$ calculated at Step S203, by adding the geometric parameter $\alpha_i^{LR}$ with the spatially expanded geometric parameter $\Delta\alpha_i$ indicating a mesostructure component, using the following Equation 4.

[Equation 4]

$$\alpha_i^{HR} = \alpha_i^{LR} + \Delta\alpha_i \quad \text{(Equation 4)}$$

Of course, weighting or noise cancellation such as smoothing may be performed for the geometric parameter $\Delta\alpha_i$. Thereby, geometric parameters including mesostructure components can be obtained from geometric parameters not including the mesostructure components.

Next, at Step S206, the image generation unit 106 generates an image (refer to an output image 14 in FIG. 3) by applying the modified geometric parameter $\alpha_i^{HR}$ modified by the Equation 4 to a reflection model. In more detail, in one example of the reflection model, a pixel value to be in the output image is determined by the following Equation 5.

[Equation 5]

$$I^{HR} = k\frac{FDG}{\pi \cdot N \cdot V} \quad \text{(Equation 5)}$$

where k is a constant number, F is a Fresnel reflection coefficient, D is a distribution function regarding roughness of the object surface, and G is a geometry attenuation coefficient. In addition, N and V are the geometric normal vector and the viewing vector shown in FIG. 4, respectively. Torrance-Sparrow model or Cook-Torrance model may be used for D. When Torrance-Sparrow model is used, D is determined by the following Equation 6.

[Equation 6]

$$D = k \exp(-\alpha_i^{HR^2}/m^2) \quad \text{(Equation 6)}$$

When Cook-Torrance model is used, D is determined by the following Equation 7.

[Equation 7]

$$D = k\frac{\exp(-\tan^2(\alpha_i^{HR})/m^2)}{m^2 \cos^4(\alpha_i^{HR})} \quad \text{(Equation 7)}$$

It should be noted that the reflection model is described in more detail in Non Patent Reference 6, pp. 731-739. Here, in the Equations 5 to 7, a designer of the image generation device may set a necessary parameter to generate an image. Or, using a simpler equation such as the following Equation 8, the image generation may be performed by determining D using Torrance-Sparrow model shown in Equation 6 and setting G=1.

[Equation 8]

$$I_i^{HR} = k\frac{\exp(-\alpha_i^{HR2}/m^2)}{N \cdot V} \quad \text{(Equation 8)}$$

where m is a coefficient of surface roughness in Torrance-Sparrow model. Since m depends on a kind of the object, a value of m may be previously held, or the image generation may be performed setting m to a certain value such as 0.1. In addition, the parameter m may be estimated from an image.

[Non Patent Reference 6] "Principles of Digital Image Synthesis", Andrew S. Glassner, Vol. 2, Morgan Kaufman Inc., 1995

As described above, the image generation device and the image generation method according to the first embodiment holds, as exempla, high-resolution components that are used to reconstructure the mesostructure, and then increased in order to spatially expand a region (exemplum map) indicated by the exempla. Thereby, the image generation device and the image generation method according to the first embodiment can generate a high-quality image of an object more clearly showing a shape such as bumps on a surface of the object, based on geometric parameters regarding the shape which is generated from a low-quality image or the like of the object. In addition, the geometric parameter reflects information of a position of a light source, and such a geometric parameter is applied to a reflection model to generate an image. This means that the image generation device and the image generation method according to the first embodiment can set a light source at any desired position, which makes it possible to generate an image of the object under a pseudo light source emitting light from any desired position.

SECOND EMBODIMENT

Figure 7:
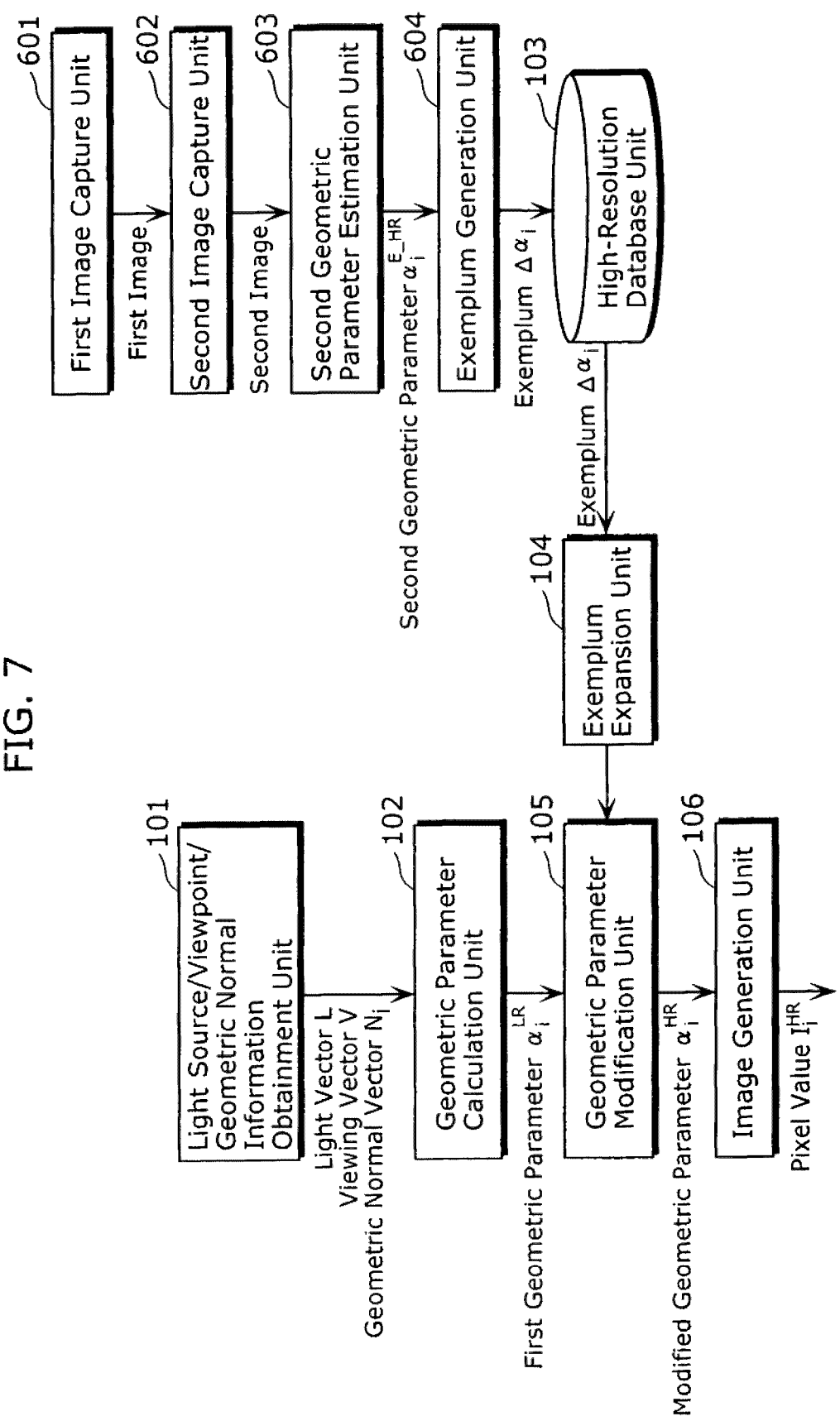
FIG. 7 is a diagram showing a basic structure of an image generation device according to a second embodiment of the present invention.

The following describes an image generation device and an image generation method according to the second embodiment with reference to the drawings. FIG. 7 is a diagram showing a structure of the image generation device according to the second embodiment. The image generation device of FIG. 7 generates a high-quality image of an object more clearly showing a shape such as bumps on a surface of the object, based on information regarding the shape which is generated from a low-quality image of the object. In order to achieve the above generation of the high-quality image, the image generation device of FIG. 7 captures a higher-quality image of the object corresponding to a highlight region of the low-quality image of the object using a zooming function of a camera or the like, then from the higher-quality image, geometric parameters of high-resolution components indicating the mesostructure are estimated as exempla, and then the exempla are increased to spatially expand a region indicated by the exempla. The image generation device of FIG. 7 includes the light source/viewpoint/geometric normal information obtainment unit 101, the geometric parameter calculation unit 102, the high-resolution database unit 103, the exemplum expansion unit 104, the geometric parameter modification unit 105, the image generation unit 106, a first image capture unit 601, a second image capture unit 602, a second geometric parameter estimation unit 603, and an exemplum generation unit 604. The structure of the image generation device according to the second embodiment as shown in FIG. 7 differs from the structure of the image generation device according to the first embodiment as shown in FIG. 1 in further including the first image capture unit 601, the second image capture unit 602, the second geometric parameter estimation unit 603, and the exemplum generation unit 604. Here, the same reference numerals of FIG. 1 are assigned to the identical units of FIG. 7, so that the identical units are not explained again below.

The first image capture unit 601 captures one or more images of an object. On example of the first image capture unit 601 is a digital camera. The captured images do not necessarily include high-resolution components indicating mesostructure. Hereinafter, the image captured by the first image capture unit 601 is referred to as a first image.

The second image capture unit 602 captures an image of a portion of the object with higher quality (namely, higher resolution). Here, the portion of the object corresponds to a highlight region of the image (first image) captured by the first image capture unit 601. Thereby, the captured higher-quality image indicates the mesostructure. Hereinafter, the image captured by the second image capture unit 601 is referred to as a second image.

The second geometric parameter estimation unit 603 estimates a second geometric parameter that indicates the shape of the surface of the object, using a pixel value of the second image captured by the second image capture unit 602 as an objective function. In other words, in the second embodiment, the second geometric parameter estimation unit 603 estimates the second geometric parameter indicating the shape of the surface of the object, from the second image captured by the second image capture unit 602 using a reflection model. The second geometric parameters include mesostructure components.

The exemplum generation unit 604 calculates high-resolution components including mesostructure components, from the second geometric parameters which include mesostructure components and are estimated by the second geometric parameter estimation unit 603. Then, the exemplum generation unit 604 generates exempla indicating an exemplum map in a two-dimensional block, and stores the generated exempla into the high-resolution database unit 103. Here, the exemplum map is not limited to a square or a rectangular.

The exemplum expansion unit 104 reads out the exempla from the high-resolution database unit 103, and increases the readout exempla in order to spatially expand a region (exemplum map) indicated by the readout exempla to fill the dimensions of a region of the object in the first image captured by the first image capture unit 601. As described in the first embodiment, it is also possible that the first image is divided into regions and the exempla are increased to expand the exemplum map to the dimensions of the region of the object. Thereby, even if the dimensions of the exemplum map is smaller than the dimensions of an output image or the dimensions of the object, the mesostructure can be reconstructed over the entire image.

Figure 8:
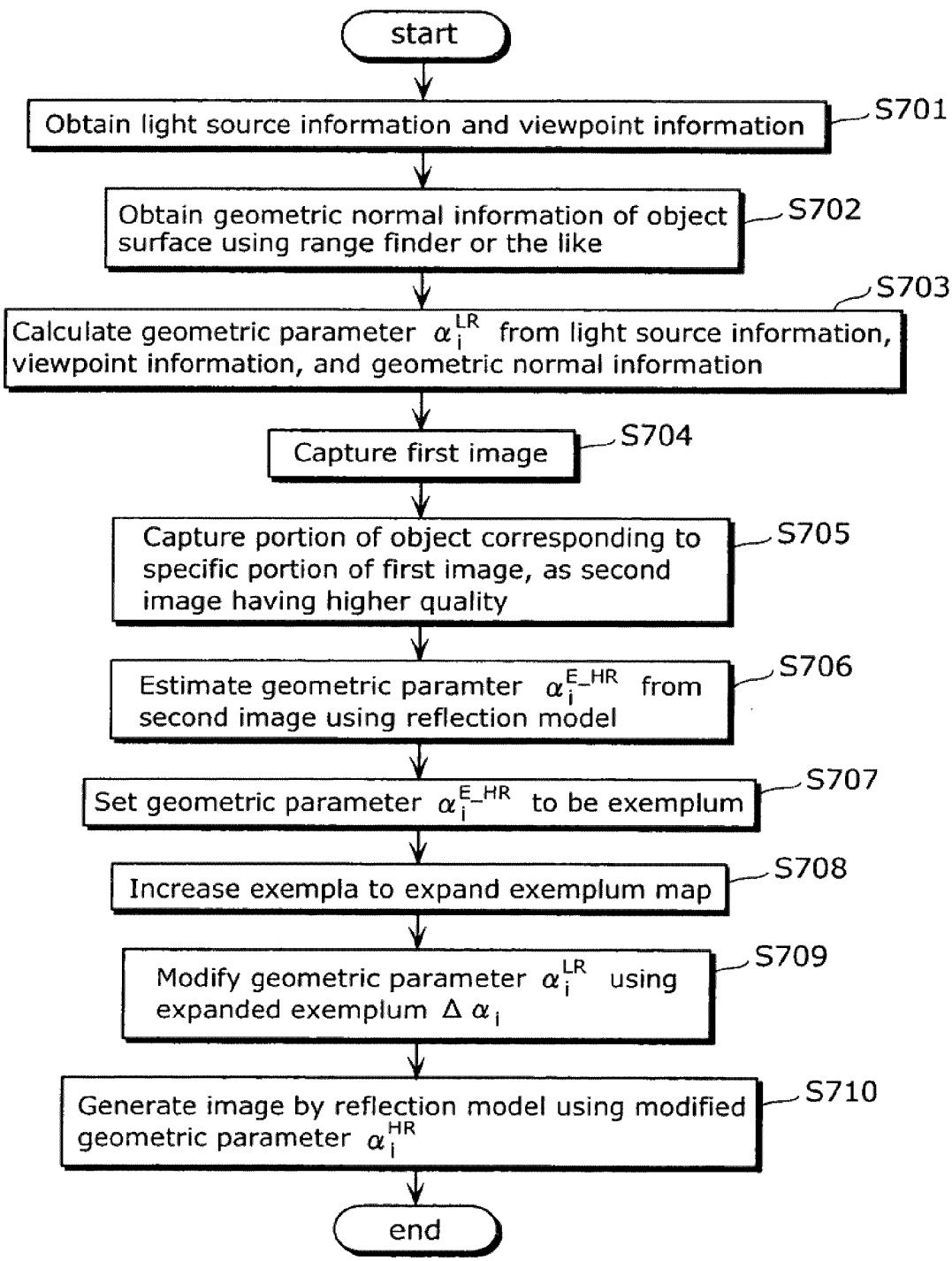
FIG. 8 is a flowchart showing basic processing performed by the image generation device according to the second embodiment of the present invention.
Figure 9:
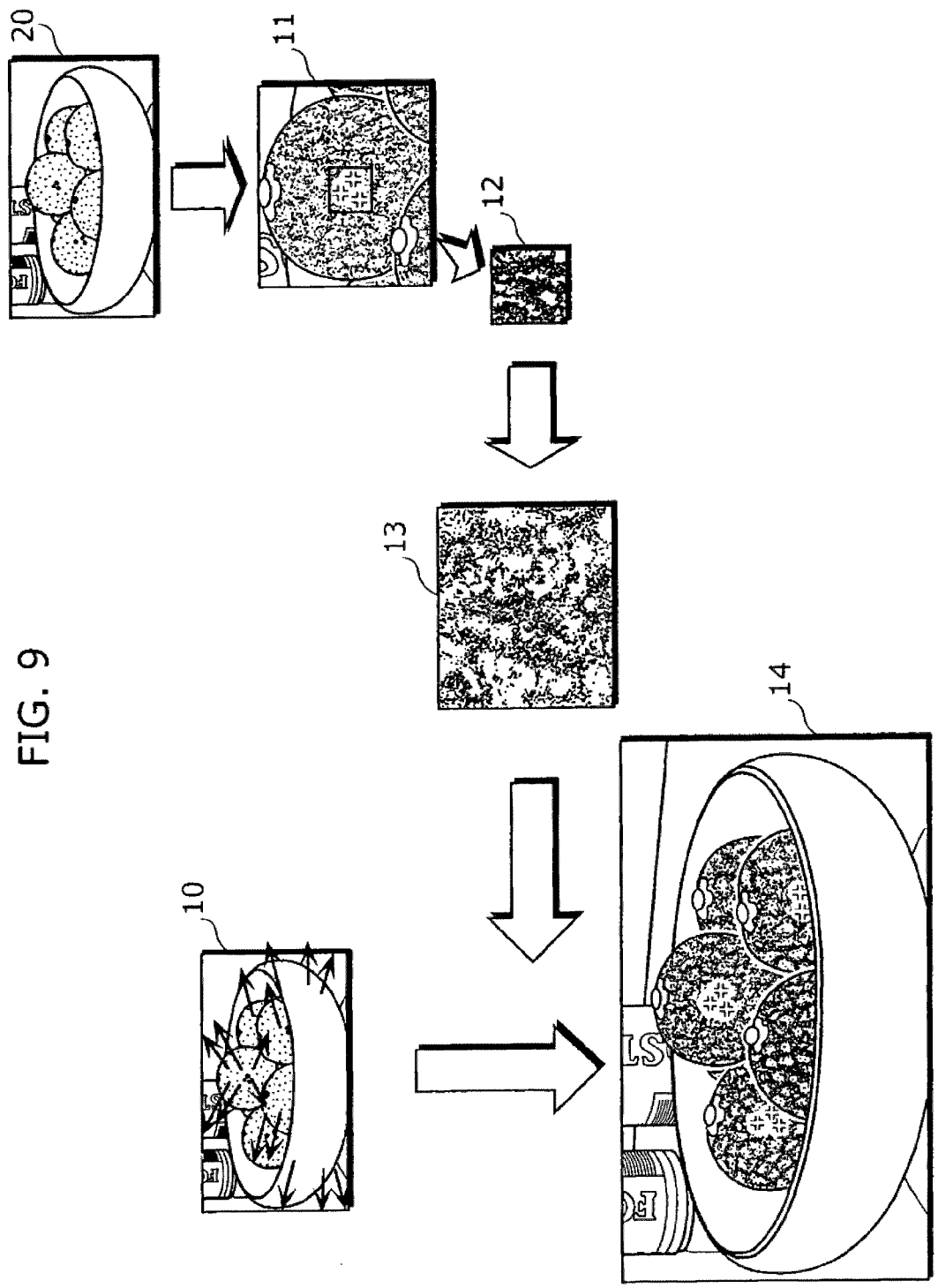
FIG. 9 is a schematic diagram showing information and an image generated by the image generation device according to the second embodiment of the present invention.

The following describes processing performed by the image generation device having the above structure according to the second embodiment of the present invention (namely, an image generation method according to the present invention), with reference to a flowchart of FIG. 8 and schematic diagrams of information and images of FIG. 9. In the image generation method according to the second embodiment, a high-quality image of an object more clearly showing a shape such as bumps on a surface of the object is generated from a high-quality image of a portion of a low-quality image of the object.

Here, the Steps S201 to S203 of FIG. 2 according to the first embodiment are identical to Steps S701 to 703 of FIG. 8 according to the second embodiment, respectively, so that the identical steps are not explained again below.

At Step S704, the first image capture unit 601 generates a first image (refer to the first image 20 of FIG. 9) of the object by capturing an image of the object using a digital camera or the like.

Figure 10:
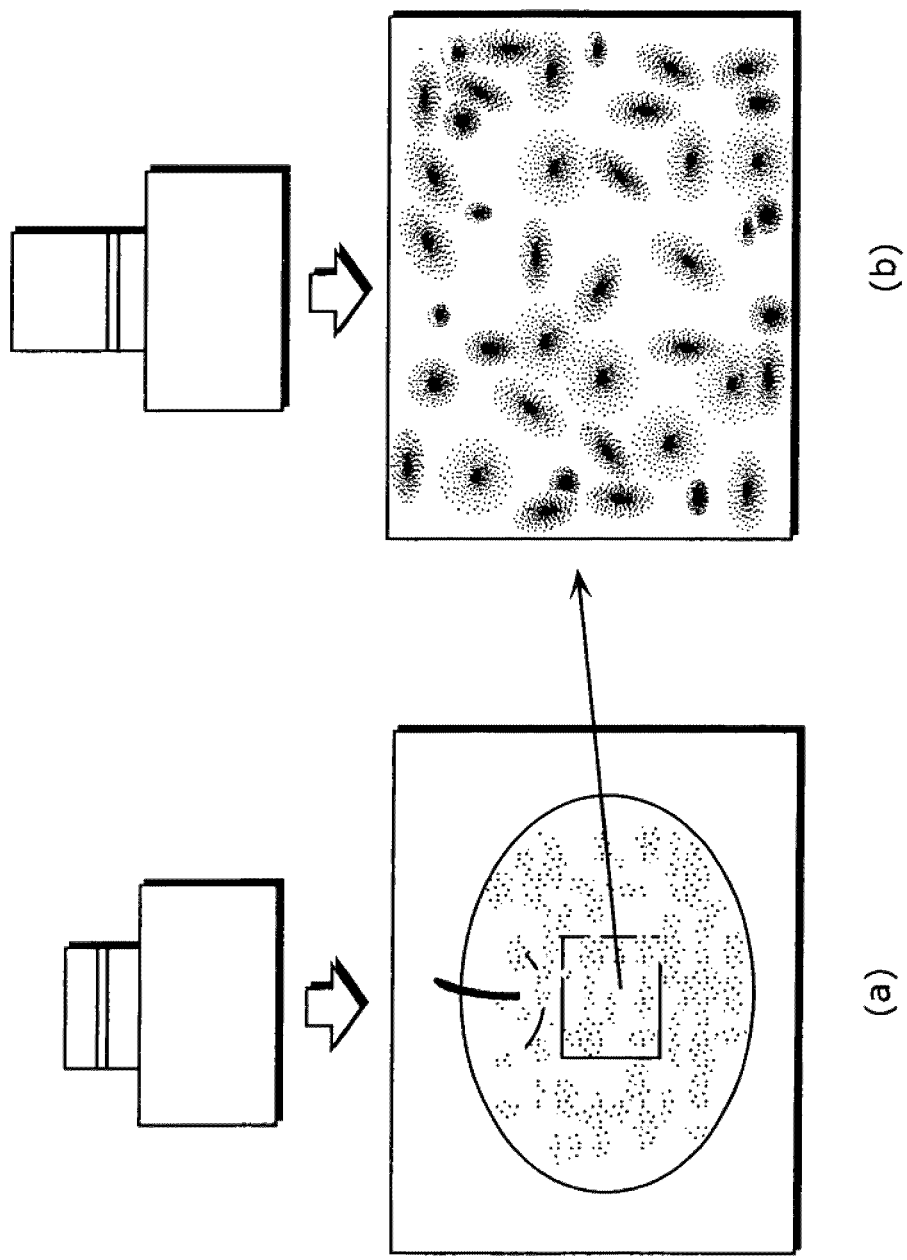
FIGS. 10 (a) and (b) show examples of a first captured image and a second captured image, respectively, according to the second embodiment of the present invention.

Next, at Step S705, the second image capture unit 602 generates a second image (refer to the second 11 of FIG. 9) having quality higher than the first image, by capturing an image of a portion of the object corresponding to a highlight region of the first image. The image-capturing of the portion corresponding to the highlight region of the first image enables the reflection model to be applicable. It should be note that the second image may be generated by using the same camera having a zooming function as the camera used for the first image, or may be by using a camera different from the camera used for the first image. It should also be noted that the highlight region of the first image captured by the first image capture unit 601 may be a region having a center with the highest brightness value in the first image. It is also possible that the highlight region of the first image is decided by segmenting the first image into blocks each having certain dimensions, then calculating an average brightness value for each block, and selecting a region having the highest average brightness value as the highlight region. Furthermore, the highlight region of the first image may be a region with a peak of the distribution of brightness values in the block. More specifically, an image of a portion of the object corresponding to a region of the first image captured by the first image capture unit 601 as shown in (a) of FIG. 10 is captured with high quality by the second image capture unit 602 to generate the second image as shown in (b) of FIG. 10. The sparse dots in (a) of FIG. 10 show that an image of mesostructure is not captured appropriately due to an insufficient resolution. However, high-quality image-capturing of the portion enables an image of the mesostructure to be captured appropriately as shown in (b) of FIG. 10.

Then, at Step S706, from the second image generated at Step S705, the second geometric parameter estimation unit 603 estimates, as an exemplum, a geometric parameter $\alpha_i^{E\_HR}$ indicating a high-resolution component using a reflection model. The estimation is performed as explained below.

The Equation 8 is rewritten to the following Equation 9.
[Equation 9]

$$Q_i = -(\alpha_i^{E\_HR^2}/m^2) + C \qquad \text{(Equation 9)}$$

where C is a constant number. In the same manner as described in the first embodiment, a value of m corresponding to the object may be previously held, or the image generation may be performed setting m to a certain value such as 0.1. Furthermore, m may be estimated from the image.

However, the following Equation 10 is given.
[Equation 10]

$$Q_i = \log I_i \qquad \text{(Equation 10)}$$

Here, C is determined by the following Equation 11.
[Equation 11]

$$C = \max(Q_i) \qquad \text{(Equation 11)}$$

where max means a maximum value. Here, it is assumed that a brightness value becomes maximum when the geometric parameter $\alpha_i^{E\_HR}$ is 0.

Next, the geometric parameter $\alpha_i^{E\_HR}$ indicating a high-resolution component of mesostructure is determined by the following Equation 12 using the above Equations 9 and 11.
[Equation 12]

$$\alpha_i^{E\_HR} = m\sqrt{\max(Q_i) - Q_i} \qquad \text{(Equation 12)}$$

Then, at S707, the exemplum generation unit 604 generates each exemplum in an exemplum map (refer to the exemplum map 12 of FIG. 9), and stores the generated exemplum into the high-resolution database unit 103.
[Equation 13]

$$\Delta\alpha_i = \alpha_i^{E\_HR} \qquad \text{(Equation 13)}$$

This means that the geometric parameter $\alpha_i^{E\_HR}$ is simply set to be the exemplum $\Delta\alpha_i$. Here, as explained in the first embodiment, the exemplum map indicated by the exempla has dimensions of N×M as shown in FIG. 5A, and each of exempla does not indicate pixel brightness but a geometric parameter $\Delta\alpha_i$ of a high-resolution component of mesostructure. Of course, the exemplum map indicated by the exempla is not limited to a square or a rectangular. In addition, the dimensions of the exemplum map may be smaller than the dimensions of the input image. In FIG. 5A, a darker portion shows a greater value of the geometric parameter $\Delta\alpha_i$. In the technique disclosed in Patent Reference 2, the information regarding the mesostructure is indicated by distribution of points using Gaussian model. Therefore, as shown in FIG. 5B, the technique disclosed in Patent Reference 2 fails to indicate spatial consecution that is seen in the mesostructure. However, the second embodiment of the present invention can solve the above problem of the conventional technology, indicating the mesostructure by the exemplum map in a two-dimensional map having dimensions of N×M.

Next, at Step S708, the exemplum expansion unit 104 increases the exempla which are generated at Step S707 and stored in the high-resolution database unit 103, in order to spatially expand the exemplum map indicated by the exempla, in the same manner as described for Step S204 of FIG. 2 (refer to an expanded exemplum map 13 in FIG. 9).

Steps S709 and S710 are identical to the Steps S205 and S206 of FIG. 2 in the first embodiment, respectively. That is, the same processing is performed to generate the output image (refer to an output image 14 in FIG. 9). Therefore, the identical steps are not explained again below.

As described above, by the image generation device and the image generation method according to the second embodiment, an image of a portion of the object corresponding to the highlight region of the first image is captured to have high quality, then from the resulting high-quality image, geometric parameters regarding high-resolution components capable of indicating the mesostructure are estimated, and an output image is generated by a reflection model using the high-resolution components. Thereby, the image generation device and the image generation method according to the second embodiment can generate a high-quality image of an object more clearly showing a shape such as bumps on a surface of the object, based on information regarding the shape which is generated from a low-quality image or the like of the object. In addition, the information regarding the shape reflects a position of a light source, and such information is applied to the reflection model to generate the output image. This means that the image generation device and the image generation method according to the second embodiment can set a light source at any desired position, which makes it possible to generate an image of the object under a pseudo light source emitting light from any desired position.

THIRD EMBODIMENT

Figure 11:
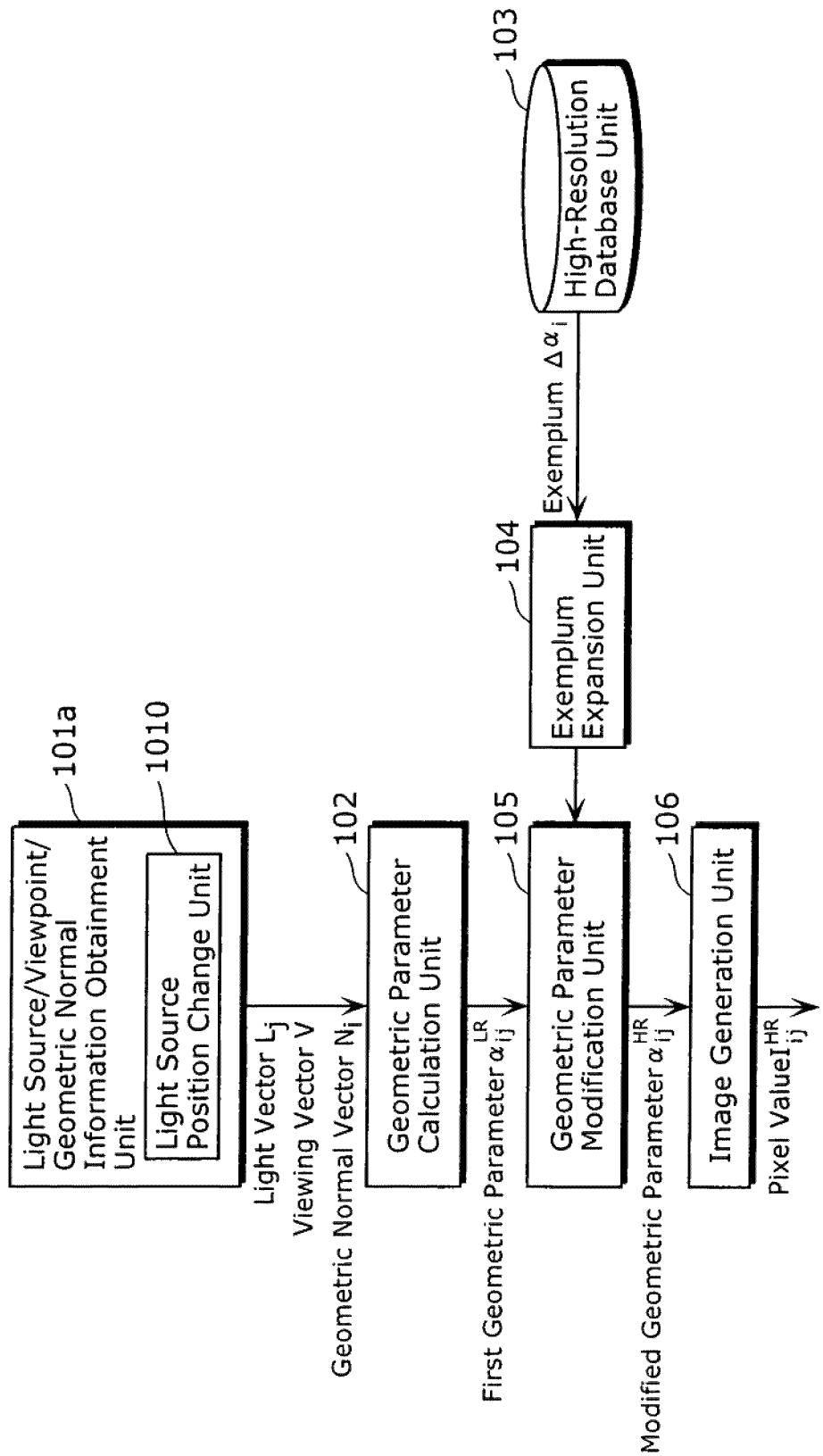
FIG. 11 is a diagram showing a basic structure of an image generation device according to a modification of the first embodiment of the present invention.
Figure 12:
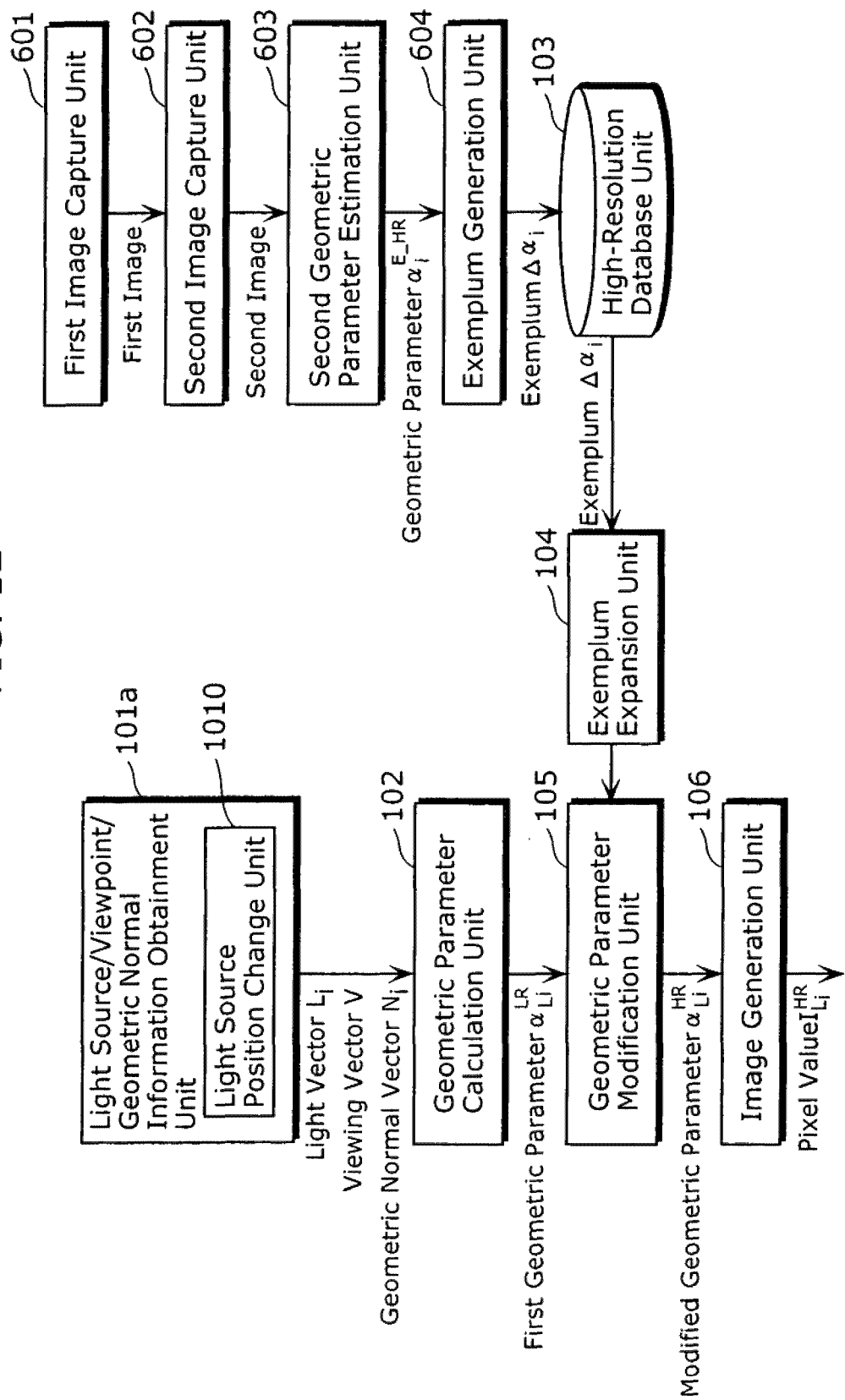
FIG. 12 is a diagram showing a basic structure of an image generation device according to a modification of the second embodiment of the present invention.

The following describes an image generation device and an image generation method according to the third embodiment with reference to the drawings. The image generation device and the image generation method according to the third embodiment can achieve image generation under a pseudo light source emitting light from any desired position, in addition to the image generation with high quality showing the mesostructure as described in the first and second embodiment. As shown in FIGS. 11 and 12, a structure of the image generation device according to the third embodiment differs from each structure of the image generation devices according to the first to second embodiments in that the light source/viewpoint/geometric normal information obtainment unit 101 is replaced by a light source/viewpoint/geometric normal information obtainment unit 101a that obtains pseudo position information of a light source. In other words, a plurality of desired positions of the light source are used as the position information of the light source in the third embodiment. Therefore, the below description is given mainly for the light source/viewpoint/geometric normal information obtainment unit 101a that is a great difference from the first and second embodiments. The image generation method of the third embodiment differs from the image generation methods of the first and second embodiments in changing the light vector L to change the corresponding geometric parameter $\alpha_i^{HR}$ indicating the mesostructure, as described below in more detail.

In other words, the image generation device according to the third embodiment can be called a modification (as shown in each of FIG. 11 and FIG. 12) of each of the image generation devices according to the first and second embodiment, by replacing the light source/viewpoint/geometric normal information obtainment unit 101 by the light source/viewpoint/geometric normal information obtainment unit 101a. The light source/viewpoint/geometric normal information obtain-ment unit 101a further includes a light source position change unit 1010 in addition to the function of the light source/viewpoint/geometric normal information obtainment unit 101. The light source position change unit 1010 generates plural pieces of position information of the light source. In more detail, the light source position change unit 1010 generates plural pieces of position information of the light source, by varying a position of the light source obtained by the light source/viewpoint/geometric normal information obtainment unit 101a along a route designated by a user, or by receiving designation of plural positions of the light source from the user.

Figure 13A:
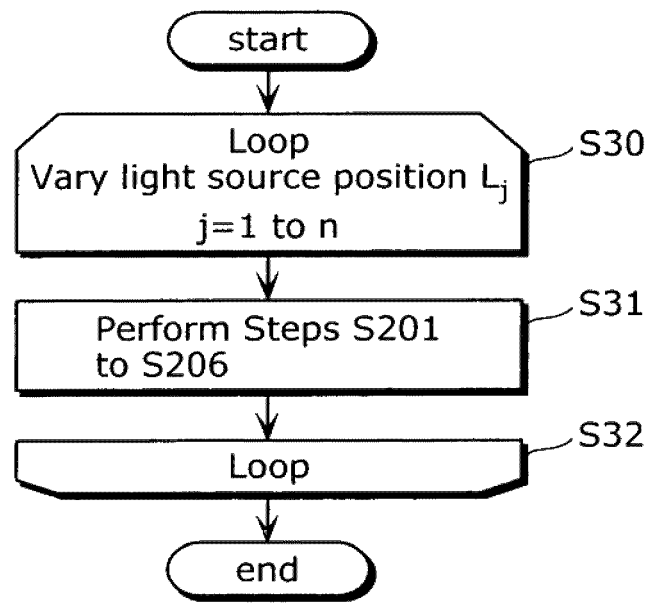
FIG. 13A is a flowchart showing basic processing performed by the image generation device according to the modification of the first embodiment of the present invention.

Next, the processing performed by the image generation device shown in FIG. 11 according to the third embodiment is described with reference to a flowchart of FIG. 13A. This image generation device according to the third embodiment is a modification of the image generation device according to the first embodiment.

Firstly, a light vector L of the light source is virtually varied to generated light vectors $L_j$ by varying a position $L_j$ of the light source (S30). Then, using each light vector $L_j$ as well as the geometric normal vector and the viewing vector V which have been obtained by the light source/viewpoint/geometric normal information obtainment unit 101a, the geometric parameter calculation unit 102 calculates a geometric parameter $\alpha_{ij}^{HR}$ for each of the varied position of the light source, by the following Equation 14 (Steps S201 to S203 in S31).

[Equation 14]

$$\alpha_{ij}^{LR} = \arccos(N_i \cdot H_j) \quad \text{(Equation 14)}$$

Here, $H_j$ is determined by the following Equation 15. The viewing vector V does not depend on the change j of the position of the light source and a point i on the object.

[Equation 15]

$$H_j = \frac{0.5(L_j + V)}{\|0.5(L_j + V)\|} \quad \text{(Equation 15)}$$

Figure 14:
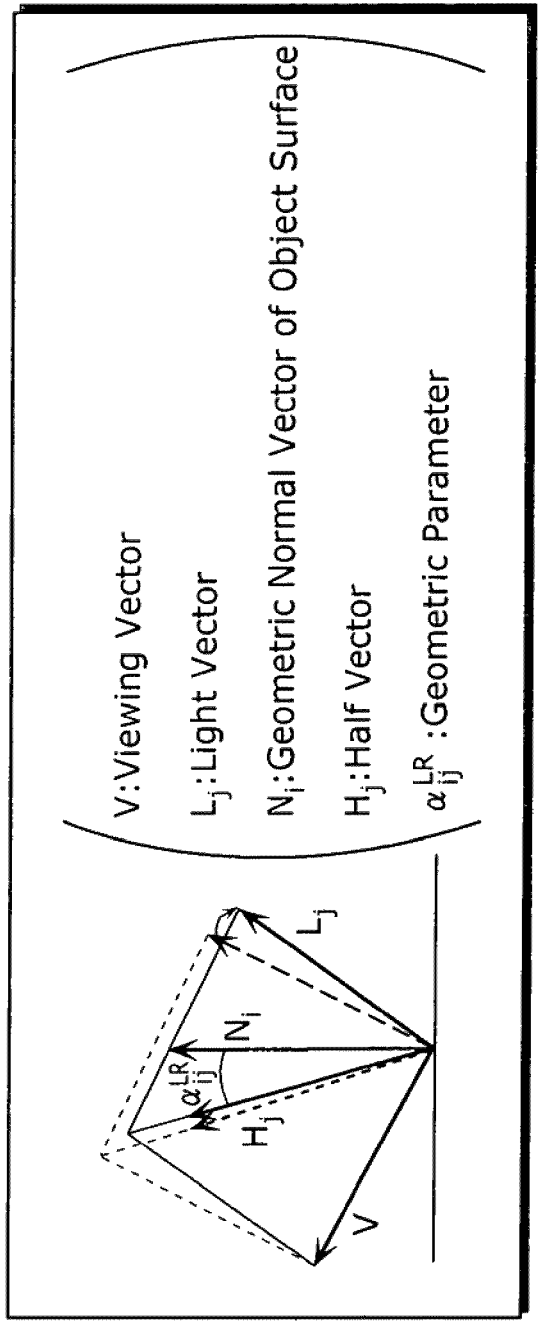
FIG. 14 is graph showing one example of a geometric parameter used for image generation under a pseudo light source according to the third embodiment of the present invention.

FIG. 14 shows how the geometric parameter $\alpha_i^{LR}$ is changed to a geometric parameter $\alpha_{ij}^{LR}$ when the light vector L is changed to the light vector $L_j$. When the light vector L is changed from a dashed line to a solid line to be the light vector $L_j$, the half vector H is also changed from a dashed line to a solid line to be a half vector $H_j$, as shown in the Equation 15. With the changes, the geometric parameter $\alpha_i^{LR}$ is changed to the geometric parameter $\alpha_{ij}^{LR}$ as seen in the Equation 14. Thereby, the geometric parameter $\alpha_{ij}^{LR}$ corresponding to each of the varied position of the light source is generated.

Referring back to FIG. 13A, in the similar manner as described at Step 205 in the first embodiment, the geometric parameter $\alpha_{ij}^{LR}$ corresponding to each of varied position of the light source is added with the geometric parameter $\Delta\alpha_i$ obtained at Step S204 which includes a mesostructure component and is spatially expanded, thereby modifying the geometric parameter $\alpha_{ij}^{LR}$ using the following Equation 16 (Steps S204 and S205 in S31).

[Equation 16]

$$\alpha_{ij}^{LR} = \alpha_{ij}^{LR} + \Delta\alpha_i \quad \text{(Equation 16)}$$

Thereby, a modified geometric parameter $\alpha_{ij}^{HR}$ that corresponds the each change j of the position of the light source and is used to generate an image under a pseudo light source can be generated. Using the modified geometric parameter $\alpha_{ij}^{HR}$ instead of the geometric parameter $\alpha_i^{HR}$, an output image under the pseudo light source is generated in the same manner as described at Step S206 in the first embodiment (Step S206 in S31, and then S32).

Figure 15:
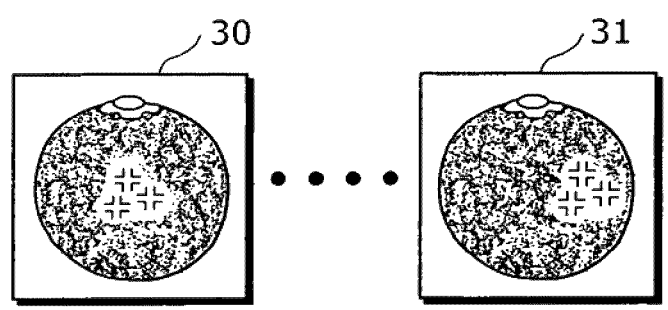
FIG. 15 is a diagram showing one example of generated images (video) under pseudo light sources according to the third embodiment of the present invention.

It should be noted that it is also possible to generate plural images under pseudo light sources corresponding to each of varied light vectors $L_j$, respectively, by slightly and consecutively varying the light vector $L_j$ (S30 to S32), and arrange the generated images as a video including images 30 to 31 as shown in FIG. 15.

Figure 13B:
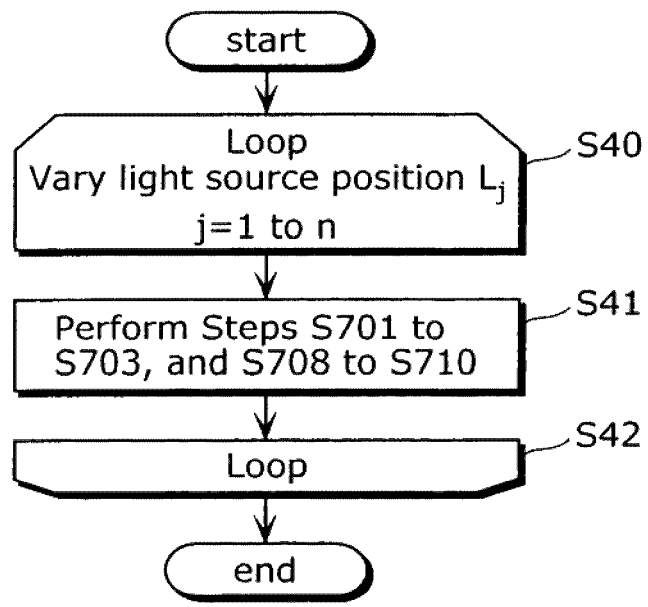
FIG. 13B is a flowchart showing basic processing performed by the image generation device according to the modification of the second embodiment of the present invention.

The same goes for an image generation method performed by another image generation device shown in FIG. 12 according to the third embodiment with reference to a flowchart of FIG. 13B. This image generation device is a modification of the second embodiment. That is, the position $L_i$ of the light source is varied (S40 to S42), and the image generation method of the second embodiment is performed for each of the positions of the light source (S41), thereby generating consecutive images corresponding to the respective positions of the light source.

As described above, the image generation image and the image generation method according to the third embodiment uses a geometric parameter under a pseudo light source which is calculated under the control of the light source position change unit 1010 that has a function of generating plural pieces of position information as the position information of the light source in addition to the function as described in the first and second embodiment. Thereby, the image generation image and the image generation method according to the third embodiment can generate an image of the object under a pseudo light source emitting light from any desired position, while using the mesostructure of the shape of the surface of the object.

MODIFICATIONS OF FIRST TO THIRD EMBODIMENTS

Figure 16:
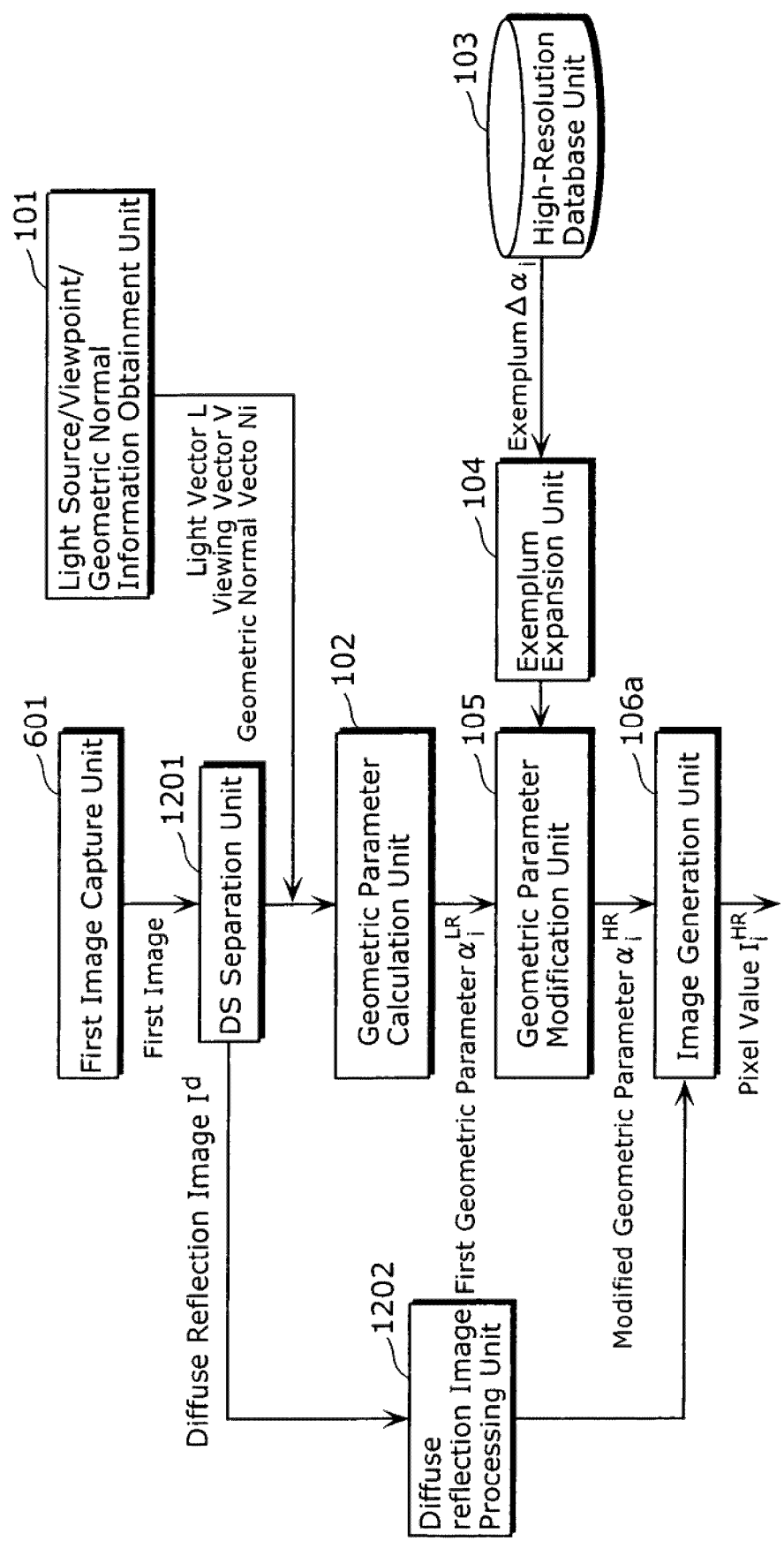
FIG. 16 is a diagram showing a basic structure of an image generation device according to a modification of any of the first to third embodiments of the present invention.

The following describes an image generation device and an image generation method which achieve higher fineness in the image generation methods according to the first to third embodiments. The image generation device and the image generation method are described as a modification of the first embodiment, but can be applied to the second and third embodiments. FIG. 16 is a diagram showing a structure of the image generation device according to the modification of the first embodiment. The image generation device of FIG. 16 according to the modification of the first embodiment generates a high-quality image of an object more clearly showing a shape such as bumps on a surface of the object, based on information regarding the shape which is generated from a low-quality image of the object. In order to achieve the above generation of the high-quality image, the image generation device of FIG. 16 separates an input image into a diffuse reflection image and a specular reflection image, and applies a reflection model to the separated specular reflection image, thereby estimating geometric parameters which can indicate the mesostructure with higher fineness. The image generation device of FIG. 16 includes the light source/viewpoint/geometric normal information obtainment unit 101, the geometric parameter calculation unit 102, the high-resolution database unit 103, the exemplum expansion unit 104, the geometric parameter modification unit 105, an image generation unit 106a, the first image capture unit 601, a DS separation unit 1201, and a diffuse reflection image processing unit 1202. The structure of the image generation device of FIG. 16 according to the modification differs from the structure of the image generation device of FIG. 1 according to the first embodiment in further including the first image capture unit 601, the DS separation unit 1201, and the diffuse reflection image processing unit 1202, as well as the image generation unit 106a which is modified from the image generation unit 106.

The first image capture unit 601 is identical to the first image capture unit 601 in FIG. 12 according to the second embodiment, so that the description for the first image capture unit 601 is not given again below. Here, the first image capture unit 601 is assumed to generate a color image as the first image.

The DS separation unit 1201 separates the first image captured by the first image capture unit 601 into diffuse reflection components and specular reflection components. Hereinafter, the separated images are referred to as a diffuse reflection image and a specular reflection image, respectively.

This image generation device according to the modification differs from the image generation device according to the first embodiment in that the geometric parameter calculation unit 102 and the geometric parameter modification unit 105 perform their processing only on the specular reflection image separated by the DS separation unit 1201.

The diffuse reflection image processing unit 1202 performs image processing on the diffuse reflection image separated from the input image by the DS separation unit 1201. Here, the diffuse reflection image processing unit 1202 may perform the processing to increase a resolution of the diffuse reflection image, or may perform nothing on the diffuse reflection image itself.

The image generation unit 106a generates a high-quality specular reflection image including mesostructure components, using the modified geometric parameters for the reflection model. Then, the high-quality specular reflection image is synthesized with the diffuse reflection image separated by the DS separation unit 1201 or the diffuse reflection image processed by the diffuse reflection image processing unit 1202, thereby generating an output image.

Figure 17:
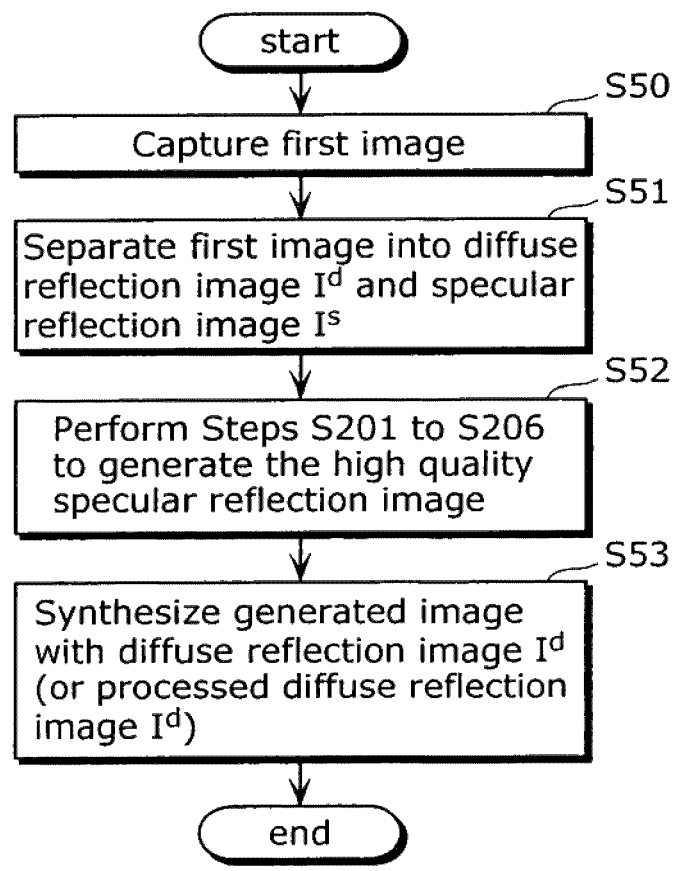
FIG. 17 is a flowchart of processing performed by the image generation device according to the modification of any of the first to third embodiments of the present invention.

The following describes the processing performed by the DS separation unit 1201, the diffuse reflection image processing unit 1202, and the image generation unit 106a in more detail with reference to a flowchart of FIG. 17.

Firstly, the first image capture unit 601 generates an input image I as the first image (S50). Then, the DS separation unit 1201 separates the input image I into a diffuse reflection image $I^d$ and a specular reflection image $I^s$ as indicated by the following Equation 17 (S51).

[Equation 17]

$$I = I^s + I^d \qquad \text{(Equation 17)}$$

The method of separating a color input image into a diffuse reflection image $I^d$ and a specular reflection image $I^s$ is disclosed in Non Patent Reference 7.

[Non Patent Reference 7] "Separation of Reflection Components Using Color and Polarization", Shree K. Nayer, Xi-Sheng Wang, and Terrance Boult, International Journal of Computer Vision, No. 21, Vol. 3, pp. 163-186, 1997

Next, the geometric parameter calculation unit 102, the exemplum expansion unit 104, and the geometric parameter modification unit 105 perform the same processing as described in the first embodiment, to generate a high-quality specular reflection image and replace the specular reflection image separated by the DS separation unit 1201 by the generated high-quality specular reflection image (S52). It is desirable that prior to creating a database the specular reflection components are extracted from the input image using the above technique, and then the high-resolution database unit 103 holds geometric parameters including mesostructure components which are obtained from the extracted specular reflection components. More specifically, in order to perform the processing described using the Equations 8 to 12, the Equation 10 in the second embodiment is rewritten to the following Equation 18. Of course, it is desirable that the second geometric parameter estimation unit 603 that is identical to the second geometric parameter estimation unit 603 of the second embodiment performs its processing on the specular reflection components.

[Equation 18]

$$Q_i = \log I_i^s \quad \text{(Equation 18)}$$

By the processing described using the Equations 5 to 8 of the first embodiment, the image generation unit 106a generates a high-resolution specular reflection image $I_i^{S\_HR}$ including mesostructure components. Then, the image generation unit 106a synthesizes the high-resolution specular reflection image with the diffuse reflection image as indicated in the following Equation 19, thereby generating a high-quality image $I^{HR}$ of the object more clearly showing the shape of the surface such as bumps, from the low-quality image of the object (S53).

[Equation 19]

$$I_i^{HR} = I_i^{S\_HR} + I_i^d \quad \text{(Equation 19)}$$

Moreover, when an output image is to be generated under a pseudo light source while showing the mesostructure as described in the third embodiment, a geometric parameter $\alpha_{Li}^{HR}$ for generating an image under a pseudo light source is calculated by the processing described using the Equations 14 to 16, and then using the geometric parameter $\alpha_{Li}^{HR}$, a high-quality specular reflection image $I_{Li}^{S\_HR}$ including mesostructure components under the pseudo light source is generated by the processing described using the Equations 5 to 8 in the first embodiment. Then, the high-quality specular reflection image $I_{Li}^{S\_HR}$ is synthesized with the diffuse reflection image as indicated by the following Equation 20 to generate an output image. Thereby, by using a geometric parameter under a pseudo light source in the image generation unit, it is possible to generate a high-quality image of the object under the pseudo light source while reflecting the mesostructure of the shape of the surface of the object.

[Equation 20]

$$I_i^{HR} = I_{Li}^{S\_HR} + I_i^d \quad \text{(Equation 20)}$$

It should be noted that the diffuse reflection image processing unit 1202 may use the diffuse reflection image itself separated by the DS separation unit 1201, or may generate albedo that is not influenced by a position of the light source by a method described in Patent Reference 3. If albedo is generated, a diffuse reflection image under a pseudo light source is generated from the albedo, and the generated diffuse reflection image is synthesized with the high-quality specular reflection image $I_{Li}^{S\_HR}$ including mesostructure components, thereby generating an output image with higher quality. It is also possible that a resolution of a diffuse reflection image is increased using albedo by the technique of the Patent Reference 3, and the generated high-resolution diffuse reflection image is synthesized with the high-quality specular reflection image.

[Patent Reference 3] Japanese Patent No. 4082714

Furthermore, the prevent invention can be realized as a variation of the third embodiment, by which the function of the exemplum expansion unit is improved to synthesize specular reflection components in consideration of correlation with other information, thereby enhancing reality of the resulting image (output image). In the case of using the technologies of Non-Patent Reference 5 and the like, the exemplum expansion is performed isotropically on a two-dimensional image. However, a mesostructure is not always isotropical. For example, like hairs, elements of specular reflection (each of which is a hair, for instance) are sometimes aligned having anisotropy. Or, like a surface of a grapefruit, fine-scale bumps on a surface correspond to light-dark difference of a texture pattern of albedo of a diffuse reflection image. In these cases, if the exemplum map is expanded isotropically, specular reflection components themselves are not integrated with each other, or the specular reflection image is not integrated with the diffuse reflection image. As a result, reality of the resulting image is lost.

Figure 18:
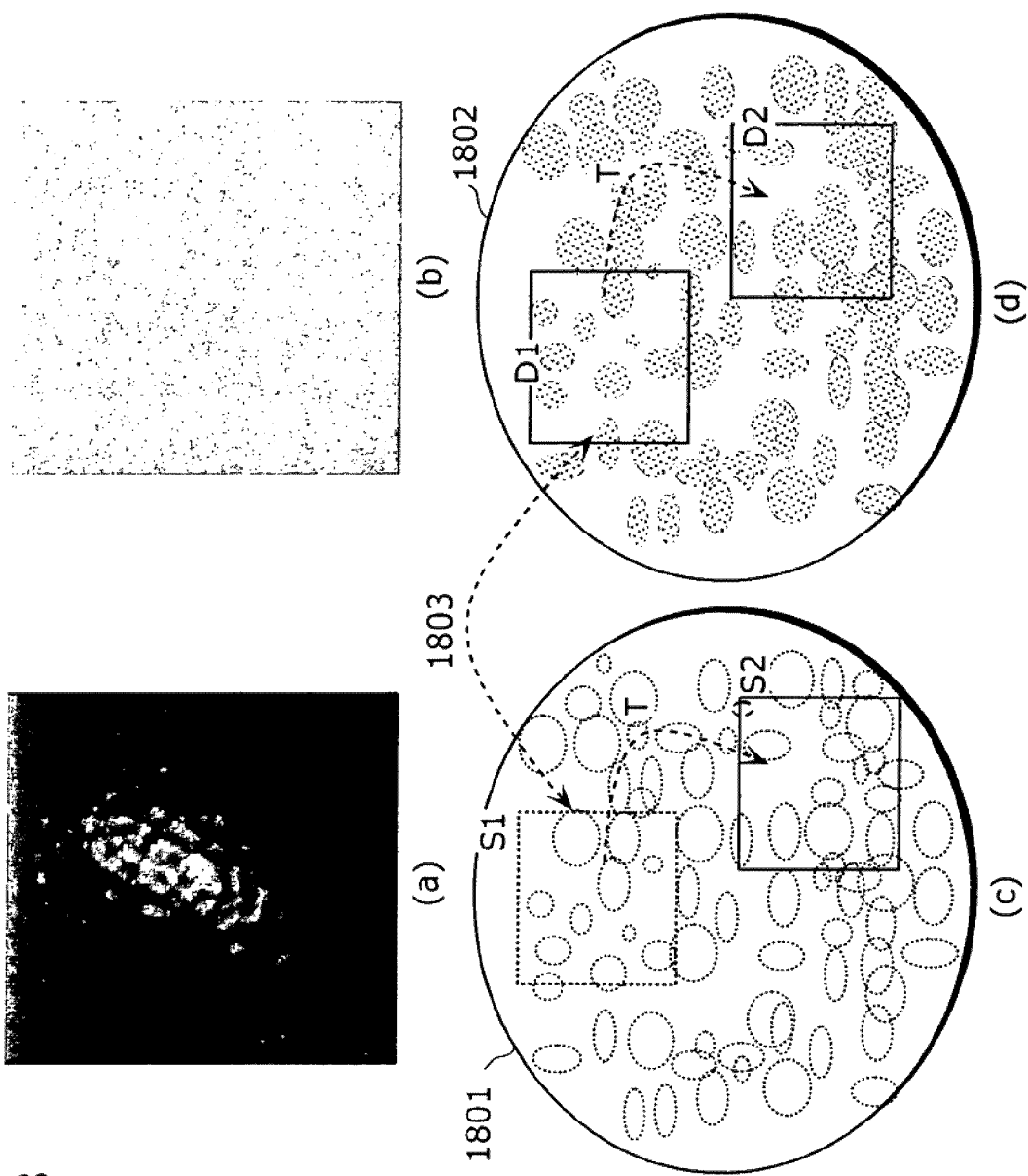
FIG. 18 (a) to (d) are diagrams for explaining a variation of the third embodiment of the present invention.

For example, (a) and (b) in FIG. 18 are an image of specular reflection components and an image of diffuse reflection components, respectively, into which an image of a grapefruit surface is separated. The bumps and specular reflection seen on the surface of (a) in FIG. 18 are not unrelated to the surface texture seen in (b) in FIG. 18, but has correlation with fine-scale bumps and color texture of the surface texture. (c) and (d) in FIG. 18 are pattern diagrams showing basic processing of an exemplum conformity expansion unit for expanding an exemplum map using the correlation between the specular reflection components and the diffuse reflection components. It is assumed that, in the specular reflection image 1801 and the diffuse reflection image 1802 of the image of the entire grapefruit, there are a specular reflection image region S1 as an exemplum map (hereinafter, specular reflection image of the region S1 is referred to as an "image S1") and a diffuse reflection image region D1 corresponding to the specular reflection image region S1 (hereinafter, diffuse reflection image of the region D1 is referred to as an "image D1"), and there is a correlation 1803 between the specular reflection image region S1 and the diffuse reflection image region D1.

Here, the image S1 is attempted to be expanded as an exemplum map to cover the region S2 (hereinafter, specular reflection image of the region S2 is referred to as an "image S2"). Here, it is a new feature that information of the corresponding regions D2 and D1 (hereinafter, diffuse reflection image of the region D2 is referred to as an "image D2") are used.

Since the regions D1 and D2 are diffuse reflection images, the entire regions D1 and D2 can be seen as texture. However, since the regions S1 and S2 are specular reflection images, a brightness value of the image S2 is too low to be seen as texture due to lightning, geometric normal, and a viewpoint even if the image S1 can be seen as texture. In other words, in the above-described third embodiment, the only method for expanding the region S1 to cover the entire image is expanding the texture in the region S1 isotropically, at random, or in consideration of connectivity depending on the mesostructure in the region S1.

On the other hand, in this variation of the third embodiment, the exemplum map of the region S1 is expanded to cover the region S2 using the correlation T between the image D1 and the image D2 both of which can be generated from the captured image. When the exemplum map of the region S1 is expanded to cover the region S2, a transformation function T for transforming the corresponding image D1 to the image D2 on a texture space is estimated from the image D2, and thereby the image S1 is transformed to the image S2 using the transformation function T. The continuity of texture between the images, for example, is interpolated properly. It should be noted that in FIG. 18 the region S1 is an exemplum map and the region S2 is a target region on which the exemplum map is expanded, and the region S2 is not always adjacent to the region S1.

Figure 19:
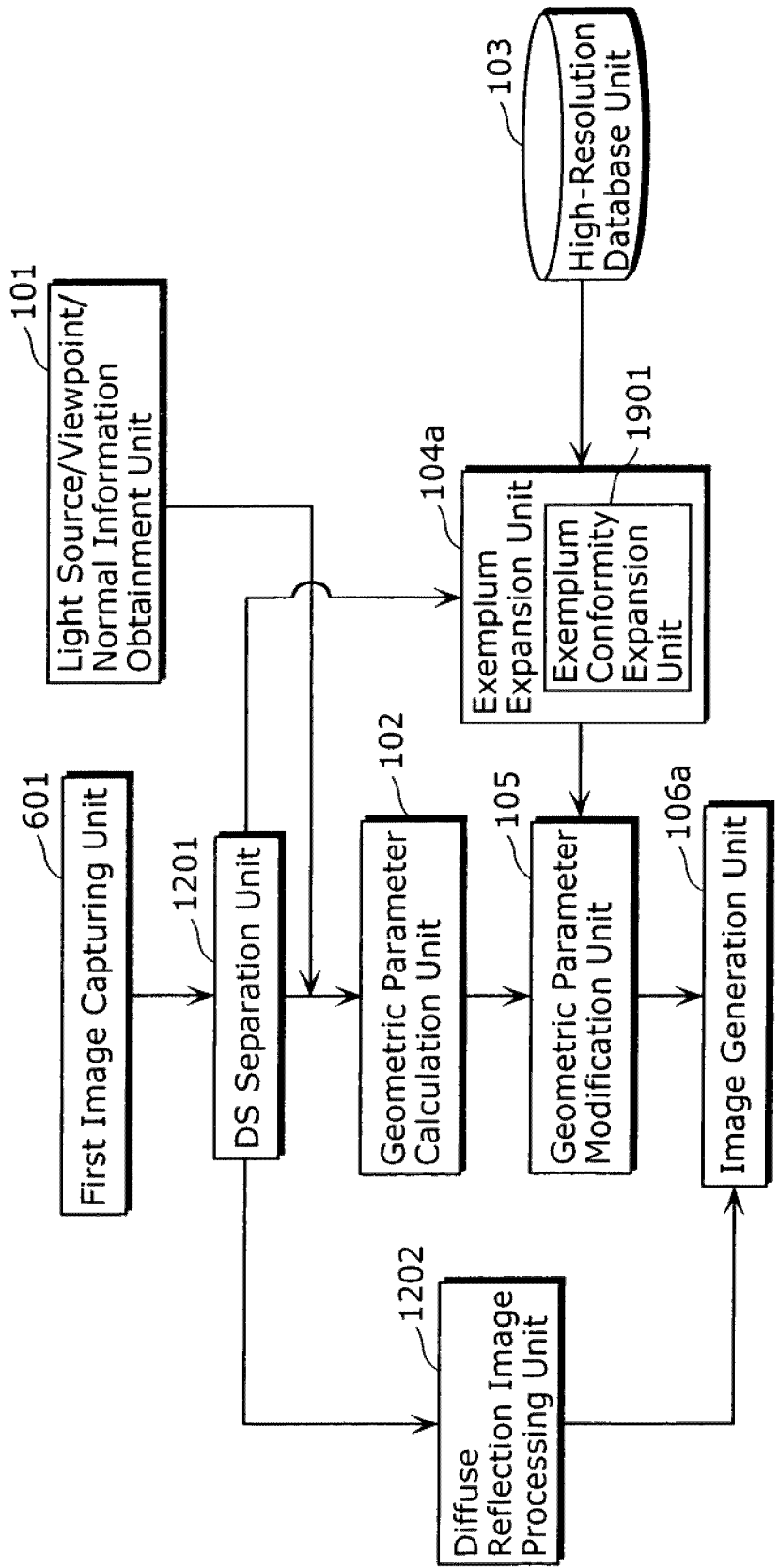
FIG. 19 is a block diagram of a structure of an image generation device according to the variation of the third embodiment of the present invention.

FIG. 19 shows a structure of an image generation device according to the variation of the third embodiment. The image generation device of FIG. 19 includes an exemplum expansion unit 104a having an exemplum conformity expansion unit 1901 as described above. The image generation device of FIG. 19 differs from the image generation device of FIG. 16 in further including the exemplum conformity expansion unit 1901 in the exemplum expansion unit, in other words, in that the exemplum expansion unit 104 is replaced by the exemplum expansion unit 104a. Therefore, the other units in the image generation device are not explained again below. Like the exemplum expansion unit 104 in FIG. 16, the exemplum expansion unit 104a in FIG. 19 reads out exempla from the high-resolution database unit 103, and then increases the readout exempla in order to expand a spatial region (exemplum map) indicated by the readout exempla to cover the object surface. However, the exemplum expansion unit 104a in FIG. 19 differs from the exemplum expansion unit 104 in FIG. 16 in further including the exemplum conformity expansion unit 1901 that expands an exemplum map with specular reflection keeping the correlation between the diffuse reflection components and the specular reflection components into which image is separated by the DS separation unit 1201. Here, the exemplum conformity expansion unit 1901 has information regarding the specular reflection image and information regarding the diffuse reflection image which are provided from the DS separation unit 1201.

Figure 20:
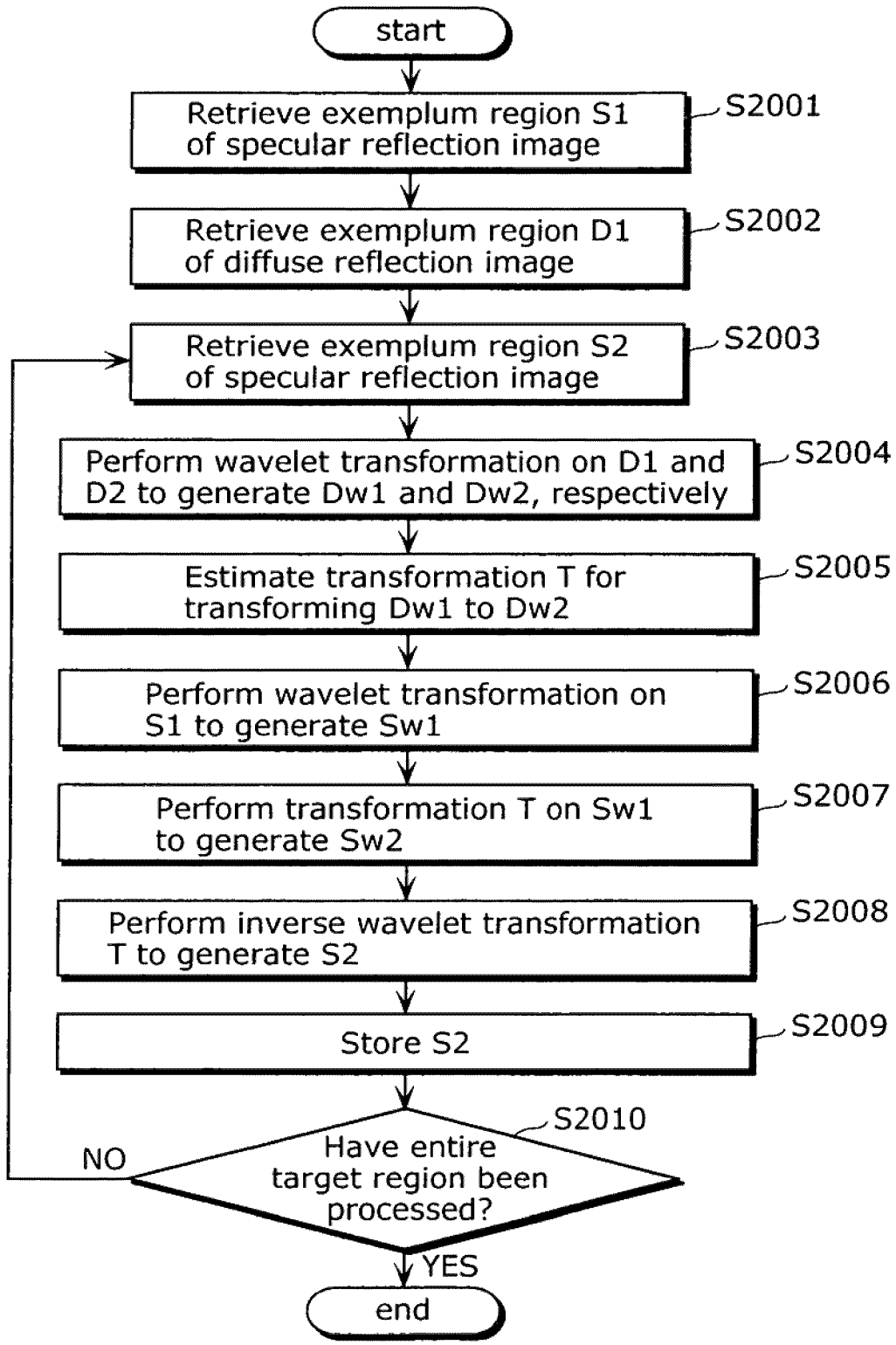
FIG. 20 is a flowchart of processing performed by the image generation device according to the variation of the third embodiment of the present invention.

FIG. 20 is a flowchart of processing performed by the exemplum conformity expansion unit 1901. From Step S2001 to Step S2003, the exemplum conformity expansion unit 1901 retrieves: (a) the exemplum region S1 of the specular reflection image (namely, the image S1); (b) the exemplum region D1 of the diffuse reflection image corresponding to the exemplum region S1 (namely, the image D1); and the exemplum region D2 of the diffuse reflection image in a region on which the exemplum map is to be expanded (namely, the image D2). Next, at Step S2004, the exemplum conformity expansion unit 1901 performs wavelet transformation on the image D1 and the image D2 to generate a feature vector image Dw1 and a feature vector image Dw2, respectively, in order to express the resulting image (output image) on a multiresolution feature space. At Step S2005, the exemplum conformity expansion unit 1901 estimates the optimum transformation T for transforming the feature vector image Dw1 to the feature vector image Dw2. This mathematical transformation T may be table transformation on a multidimensional vector space or matrix transformation. At Step S2006, the exemplum conformity expansion unit 1901 performs wavelet transformation on the image S1 to generate a feature vector image Sw1. At Step S2007, the exemplum conformity expansion unit 1901 performs transformation T on the feature vector image Sw1 to generate a feature vector image Sw2. In other words, the image S1 is transformed using the transformation T in the feature vector space to be a mesostructure (image Sw2) having high correlation with the image D2. At step S2008, the exemplum conformity expansion unit 1901 performs inverse wavelet transformation on the image Sw2 to generate the image S2. At Step S2009, the exemplum conformity expansion unit 1901 stores the image S2 as an exemplum map expanded on the region S2. If the expansion has not yet been completed to cover the entire target region at Step S2010, the processing returns to Step S2003 to perform processing for the next region S2.

By the above processing, the mesostructure with specular reflection is expanded having inconsistency using correlation with the diffuse reflection image. As a result, if a light source varies, the reality of the state of the surface reflection in the resulting image (output image) is more enhanced.

As described above, the image generation device and the image generation method according to the modification separate an input image into diffuse reflection components and specular reflection components, and applies a reflection model only to the specular reflection components to increase quality. This means that the reflection model is applied only to image components for which the reflection model is originally to be applied (namely, specular reflection components). Thereby, the image generation device and the image generation method according to the modification can generate a high-quality image of the object more correctly and clearly showing a shape such as bumps on a surface of the object by using the mesostructure. In addition, while clearly showing the shape such as bumps by using the mesostructure, the image generation device and the image generation method according to the modification can generate an image of the object under a pseudo light source emitting light from any desired position.

FOURTH EMBODIMENT

The following describes the fourth embodiment according to the present invention. The image generation device according to the fourth embodiment is a face image synthesis simulation system (hereinafter, referred to simply as a "face synthesis system"). In recent years, face authentication and face synthesis technologies have been developed to a practical level, and a live-action animation technology is practically used. By the live-action animation technology, a prepared face model generated from a single two-dimensional face image is fitted to generate a three-dimensional model, thereby moving the face vertically and horizontally or changing expression of the face. However, if this technology is applied to a simulation for a hair style or the like, reality of the resulting image (output image) is significantly lost. The reason is explained below. Since reflection characteristics of a human face are almost similar to those of a perfectly-diffused object, there is no significant change in values of the reflection characteristics due to viewpoint variation. On the other hand, since hairs are typical specular reflection objects, a position or a shape of a surface of specular reflection on a hair should be changed according to a change of an angle of a head with the hair. However, the above conventional technology cannot produce such change in the resulting image (output image). The same problem also occurs in specular reflection of a makeup lip wearing lipstick or the like in makeup simulation. Any conventional face synthesis image technologies merely synthesizes diffuse reflection image without specular reflection. Here, each of the reflection on hairs and the reflection on makeup lip can be considered as specular reflection regarding fine-scale bumps (namely, mesostructure) on the object surface. Therefore, reconstruction of the mesostructure is effective in this synthesis image. Regarding a hair, it is preferable to use a mesostructure having strong spatial anisotropy in a direction of the hair. Regarding a lip, it is preferable to use a mesostructure having anisotropy in a direction of vertical stripes, for example.

More specifically, it is necessary that a feature of a mesostructure in a region such as a hair is extracted from an input face image or the like, and then the extracted feature is reconstructed by expanding the feature to be continuous under three different conditions of light source variation, viewpoint variation, and object geometric normal variation so that the expansion satisfies the three different conditions.

Figure 21A:
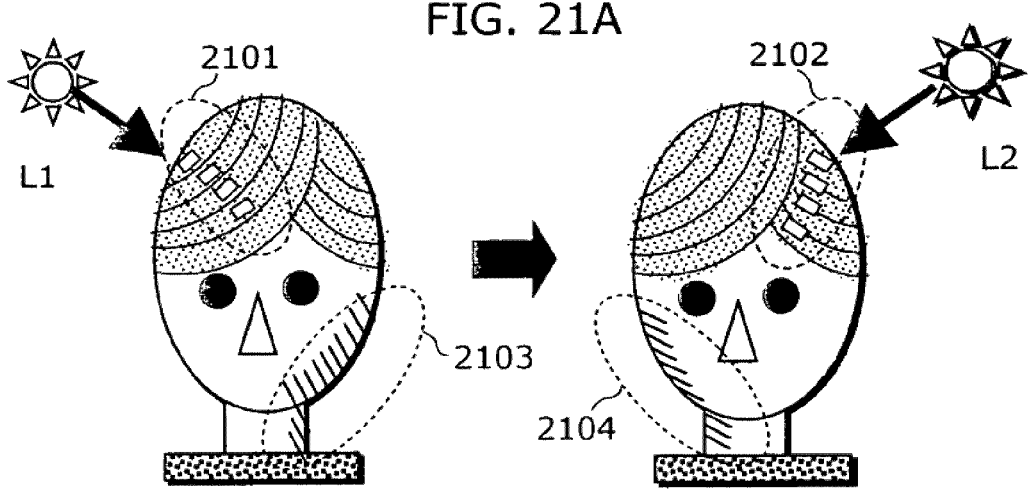
FIG. 21A is a diagram for explaining a principle of processing performed by a face synthesis system according to the fourth embodiment of the present invention.
Figure 21B:
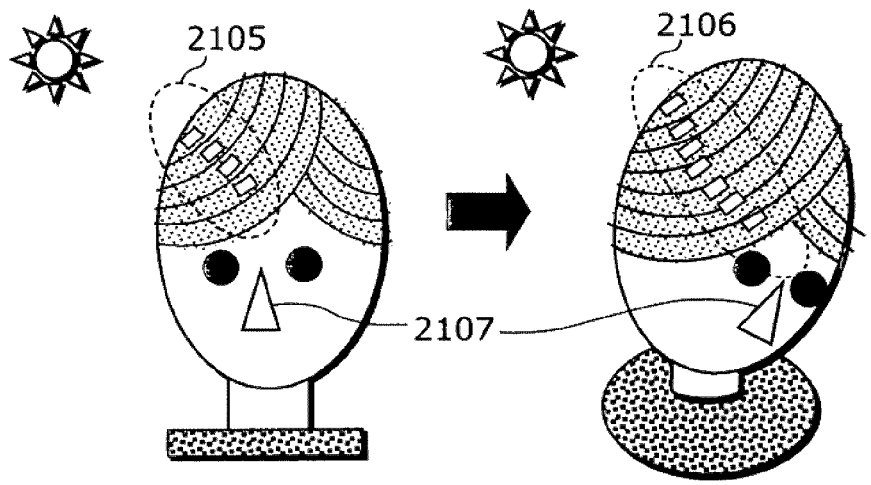
FIG. 21B is a diagram for explaining the principle of processing performed by the face synthesis system according to the fourth embodiment of the present invention.
Figure 21C:
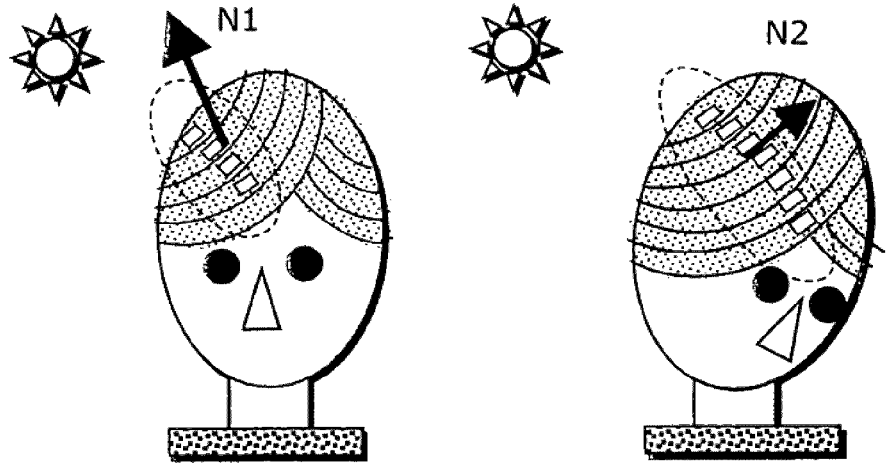
FIG. 21C is a diagram for explaining the principle of processing performed by the face synthesis system according to the fourth embodiment of the present invention.

FIGS. 21A to 21C are diagrams each showing an example of a dummy head wearing hairs, explaining conditions under which an appearance (view) of a mesostructure is changed.

FIG. 21A shows a situation where an appearance of reflection (mesostructure) of a surface of a hair is changed when a light source vector is changed (more specifically, a light source located at a position L1 moves to a position L2). In this situation, a position of reflection is changed from reflection 1201 to reflection 2102. Here, there is no change in a geometric normal vector and a viewpoint vector.

It is well known that a brightness due to specular reflection varies depending on a relationship among three vectors of a light source vector L, a geometric normal N, and a viewpoint vector V, and that a brightness due to diffuse reflection varies depending only on the light source vector L and the geometric normal N. Therefore, under the above situation (conditions) where the light source moves, even if a global appearance of the object (a visible part of the object or a way of distortion of the object) has no change, brightness values of both specular reflection and diffuse reflection are changed. In FIG. 21A expresses the situation by reflection 2101 and 2102 and shadows 2103 and 2104.

Next, in an example of the appearance change of FIG. 21B, it is assumed that the light source vector is not changed but the viewpoint vector is changed from V1 to V2 so that the appearance is seen from a rather upper level. When the viewpoint is changed, a gross shape of the object is changed or a view of the shape is changed. In FIG. 21B, since the viewpoint is changed to see the dummy from an upper level, most of a visible part of the dummy head is a region of hairs. Furthermore, since the change is relatively a change in the light source vector, the specular reflection is changed from reflection 2105 to reflection 2106. However, the brightness values of the diffuse reflection components are not changed even if the viewpoint vector V is changed, there is no change in the brightness values if the corresponding same position 2107 has only brightness values of diffuse reflection components.

Next, an example of the appearance change of FIG. 21C is a situation where the object itself is inclined rather downwards and the geometric normal N is changed from N1 to N2. This situation occurs when a face model or the like as the object is moved using a computer-generated (CG) animation synthesis technology or the like. In this situation, if the relative changes of the viewpoint vector and the geometric vector are the same, the gross shape and the view of the object are not different from those in the situation of the viewpoint change in FIG. 21B, but the states of specular reflection and diffuse reflection are different from those in the situation of FIG. 21B. However, if it is assumed that the object is separated from a background and treated as only the head of the dummy, the brightness values of specular reflection and diffuse reflection can be considered as data changed in the specific situation of the viewpoint variation. Therefore, depending on applications, the situation of FIG. 21C does not need to be considered, and only the situations of the light source variation in FIG. 21A and the viewpoint variation in FIG. 21B are considered.

Figure 22A:
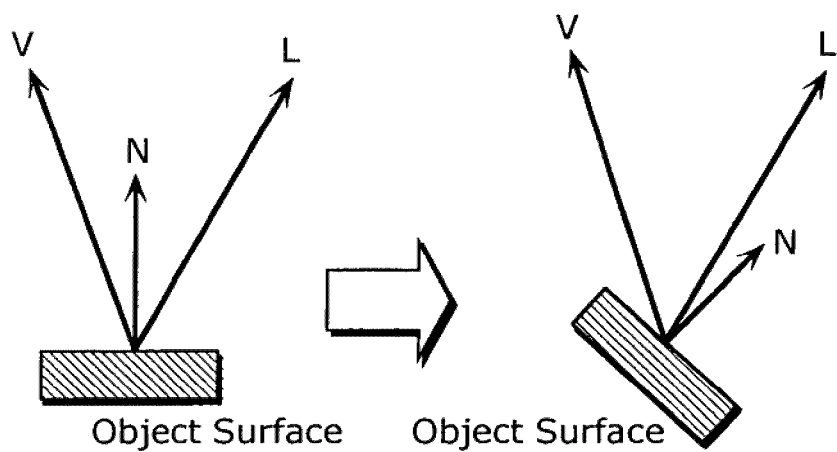
FIG. 22A is a diagram for explaining in more detail the principle of processing performed by the face synthesis system according to the fourth embodiment of the present invention.
Figure 22B:
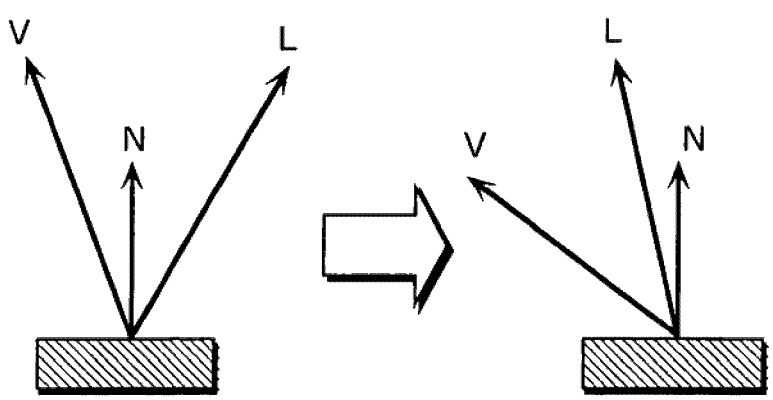
FIG. 22B is a diagram for explaining in more detail the principle of processing performed by the face synthesis system according to the fourth embodiment of the present invention.

FIG. 22 shows the reason of the above. FIG. 22A shows the situation where the object moves shown in FIG. 21C. FIG. 22B shows the situation where the viewpoint moves shown in FIG. 21B. If the geometric normal N is perpendicular to the object surface and the light source vector L and the viewpoint vector V are located at the shown positions, when the object turns at an angle θ, the light source vector L and the viewpoint vector V are not changed but only the geometric normal N is changed at −θ. Therefore, brightness values of diffuse and specular reflection which are determined by a relative relationship among the light source vector L, the geometric normal N, and the viewpoint vector V are changed together with the global appearance of the object. In this situation, the relative relationship is kept even if the object is not changed but only the light source vector L and the viewpoint vector V are changed at an angle −θ as shown in FIG. 22B. Therefore, the brightness value of the diffuse and specular reflection are the same as those calculated in this situation, together with the global appearance of the object.

As described above, in bosh situations of the light source variation and the viewpoint variation, the change of the object appearance and the brightness value of the surface can reconstruct the mesostructure significantly sensitive to the image-capturing conditions, thereby enhancing reality of the view of the resulting image (output image).

Figure 23:
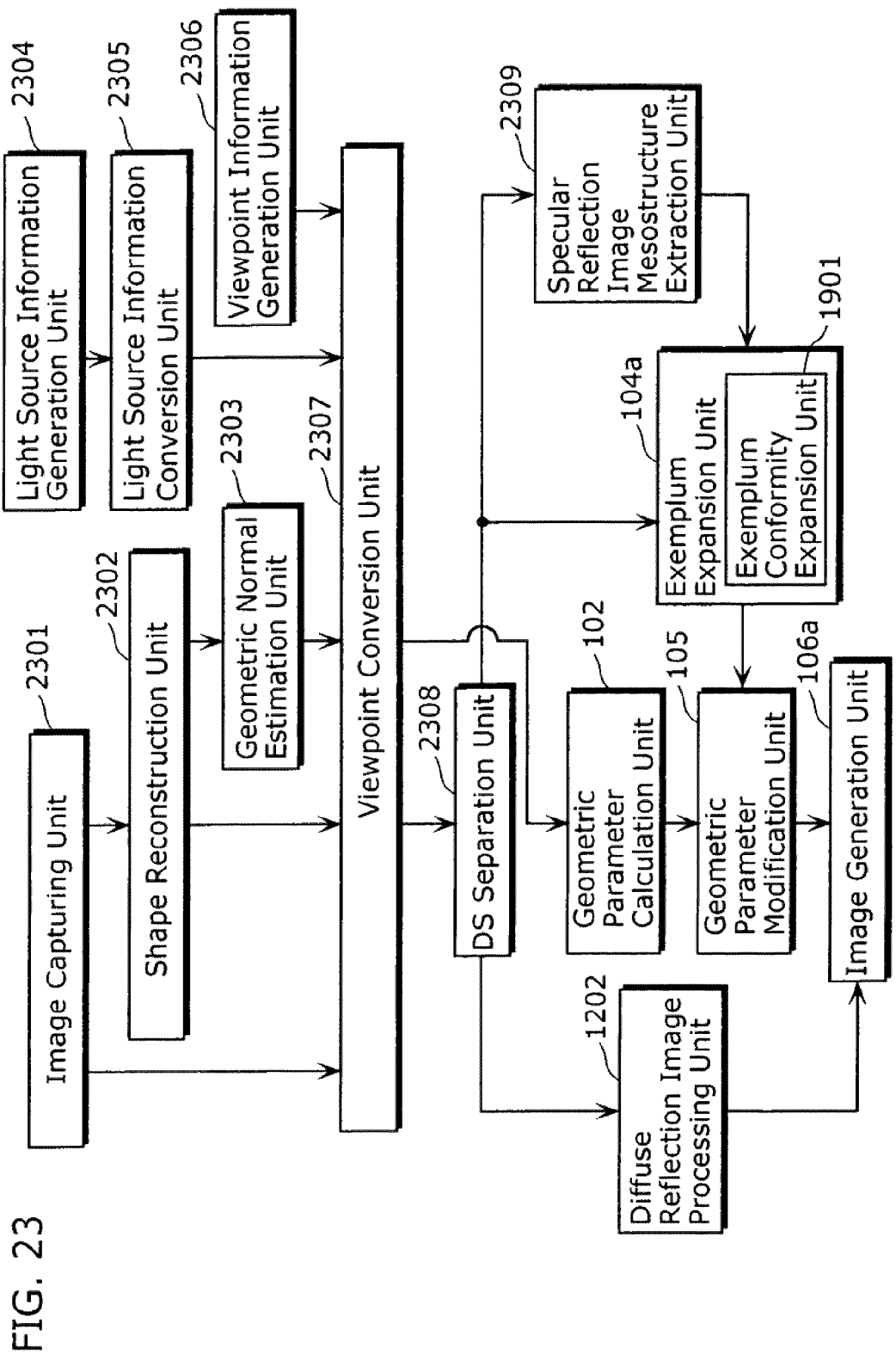
FIG. 23 is a block diagram showing a structure of the face synthesis system according to a variation of the fourth embodiment of the present invention.

FIG. 23 is a block diagram of the face synthesis system according to the fourth embodiment. The face synthesis system can vary appearance of an object according to the two kinds of varying conditions which are the light source variation and the viewpoint variation as described above. The face synthesis system is an example of the image generation device that performs conversion to change a position of a light source and a viewpoint for an image generated by imaging an object, thereby generating an image with higher quality by reconstructing the state of reflection of a mesostructure. As a result, in the generated image, the object is seen as illuminated by light emitted from a desired light source and viewed from a desired viewpoint. This face synthesis system includes an image capturing unit 2301, a light source information generation unit 2304, a light source information conversion unit 2305, a shape reconstruction unit 2302, a geometric normal estimation unit 2303, a viewpoint information generation unit 2306, a viewpoint conversion unit 2307, a DS separation unit 2308, the geometric parameter calculation unit 102, a specular reflection image mesostructure extraction unit 2309, the exemplum expansion unit 104a, the geometric parameter modification unit 105, and the image generation unit 106a. The image capturing unit 2301 generates an image (original image) by capturing an image of an object. The light source information generation unit 2304 generates light source information indicating a position of a light source. The light source information conversion unit 2305 converts the light source information to another so that the position of the light source is changed to another desired position. The shape reconstruction unit 2302 holds shape data indicating a shape of a surface of the object. The geometric normal estimation unit 2303 generates a geometric normal of the object based on the shape data held by the shape reconstruction unit 2302. The viewpoint information generation unit 2306 determines a position (viewpoint) of a camera capturing an image of the object. The viewpoint conversion unit 2307 changes the shape data held in the shape reconstruction unit 2302 and change the viewpoint determined by the viewpoint information generation unit 2306 to a desired different position. The DS separation unit 2308 separates the captured image into a specular reflection image and a diffuse reflection image. The geometric parameter calculation unit 102 performs a predetermined arithmetic operation using the light source information, the viewpoint, and the geometric normal for each point in the object surface which corresponds to a pixel in an eventually generated output image, thereby calculating a geometric parameter indicating a shape of the object. The specular reflection image mesostructure extraction unit 2309 extracts exempla, which are geometric parameters indicating a mesostructure, from the specular reflection image separated by the DS separation unit 2308. The exemplum expansion unit 104a includes the exemplum conformity expansion unit

1901 that increases the extracted exempla in order to expand a spatial region (exemplum map) indicated by the extracted exempla to cover the object surface, while keeping correlation between the extracted exempla and the diffuse reflection image separated by the DS separation unit 2308. The geometric parameter modification unit 105 modifies the geometric parameter calculated by the geometric parameter calculation unit 102, using the exemplum map expanded by the exemplum conformity expansion unit 1901, thereby generating a modified geometric parameter. The image generation unit 106a calculates a pixel value of the each point of the output image by applying the modified geometric parameter generated by the geometric parameter modification unit 105 to a reflection model for deciding the pixel value, thereby generating the output image.

The image capturing unit 2301 captures an image of an object to generate an image I (i, j). The shape reconstruction unit 2302 reconstructs a three-dimensional surface of the object. Then, the geometric normal estimation unit 2303 generates (estimates) a geometric normal of the surface. In order to reconstruct the shape of the structure or estimate the geometric normal, it is possible to first reconstruct the shape by three-dimensional positions using a stereo camera or the like, and then calculate the geometric normal from the reconstructed shape. It is also possible to first calculate the geometric normal and then reconstruct the shape. Especially if the object is a "face", it is also possible to use the technology of using a three-dimensional face model for a two-dimensional input image to generate an output image, as disclosed in Non-Patent Reference 8.

[Non-Patent Reference 8] Volker Blanz, Thomas Vetter: "A Morphable Model for the Synthesis of 3D faces", SIGGRAPH 1999

The light source information generation unit 2304 generates information of illumination environment for the object. If a light source model can be approximated by parallel light, 2 degrees of freedom of the light source vector may be determined. In order to generate the light source information, there is a method of using specular spheres as disclosed in Non-Patent Reference 9.

[Non-Patent Reference 9] Mark W. Powell, Sudeep Sarker, and Dmity Goldgof: "A Simple Strategy for Calibrating the Geometry of Light Sources", IEEE Transaction on pattern analysis and machine intelligence, Vol. 23, No. 9, September 2001, pp. 1023-1026

The light source information conversion unit 2305 freely changes the light source vector when imaging the object to a desired light source vector in order to synthesize the image for which the light source is changed.

The viewpoint information generation unit 2306 generates: a camera external parameter indicating a light axis in a world coordinate system of the camera imaging the object; and camera internal parameters indicating a focal point distance, a position of a pixel located at the light axis center, and the like.

The viewpoint conversion unit 2307 freely changes the shape information held in the shape reconstruction unit 2302 and changes the viewpoint to a desired different viewpoint by changing the camera external parameters. As a result, the viewpoint conversion unit 2307 can generates an image having a global appearance different from that of the original image, using pixels of the original image. At the same time, a viewpoint of the geometric normal image generated by the geometric normal estimation unit 2303 is also changed to be used to change a viewpoint of the specular reflection image including the mesostructure.

The DS separation unit 2308 separates pixel values (brightness values) of the image for which the viewpoint has been changed to another into diffuse reflection components and specular reflection components. The generated specular reflection image is used for exemplum conformity expansion in consideration of the mesostructure.

The diffuse reflection image processing unit 1202 does not perform any processing when only the viewpoint is converted (changed). However, when the light source is changed, the diffuse reflection image processing unit 1202 modifies Lambert's cosine law of a surface using the geometric normal information and the light source information for synthesizing change in brightness.

The specular reflection image mesostructure extraction unit 2309 extracts a texture structure at a brightness level which is calculated by binarizing the generated specular reflection image. Using the texture structure, a geometric parameter $\alpha$ is calculated according to the above-presented Equation 14, for example. The specular reflection model of a hair can be expressed by a reflection model of Phong using a light source vector L, a geometric normal vector N, and a viewpoint vector V (see Non-Patent Reference 10).

[Non-Patent Reference 10] J T. Kajiya T L. Kay: "Rendering fur with three dimensional textures", SIGGRAPH, 1989, pp 271-280

Figure 24:
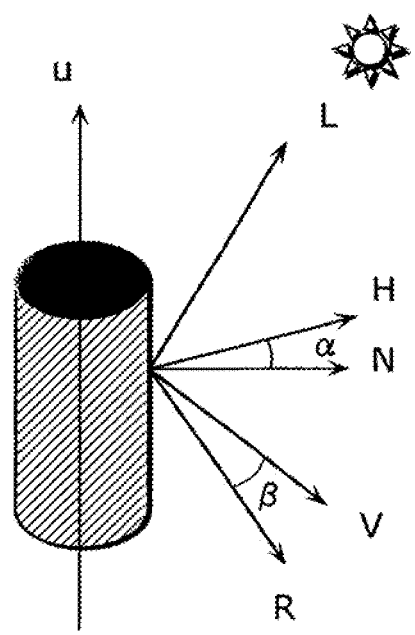
FIG. 24 is a diagram for explaining a reflection model of a hair.

FIG. 24 is a diagram explaining a reflection model of a hair. Here, a hair is modeled in a cylinder shape having a main axis u. In Non-Patent Reference 10, the Phong model is used for specular reflection of a hair. In the Phong model, attenuation of reflection is expressed by (a) the light source vector L and (b) a result of power function of a cosine function of an angle $\beta$ between (b-1) a mirror reflection vector R on which the light source vector L has specular reflection and (b-2) the viewpoint vector.

Here, the reconstruction is performed using Torrance-Sparrow model or Cook-Torrance model that have been explained using the above-presented Equations 5 and 6, an angle $\alpha$ between the half vector H and the geometric normal N can be used instead of the angle $\beta$. In short, the geometric parameter same as that used in the first embodiment can be used for a reflection model of a hair.

Meanwhile, for a reflection model of a hair, detailed modeling of anisotropic reflection, scattering, and transmission phenomenon has been researched in the fields of computer graphics. However, in the fourth embodiment, a hair is expressed as a mesostructure in an original captured image of a hair. Therefore, in the fourth embodiment, anisotropy is not considered for a level of a reflection model, and anisotropic reflection is expressed as a mesostructure.

The exemplum conformity expansion unit 1901 spatially expands the exemplum map, keeping continuity.

Figure 25:
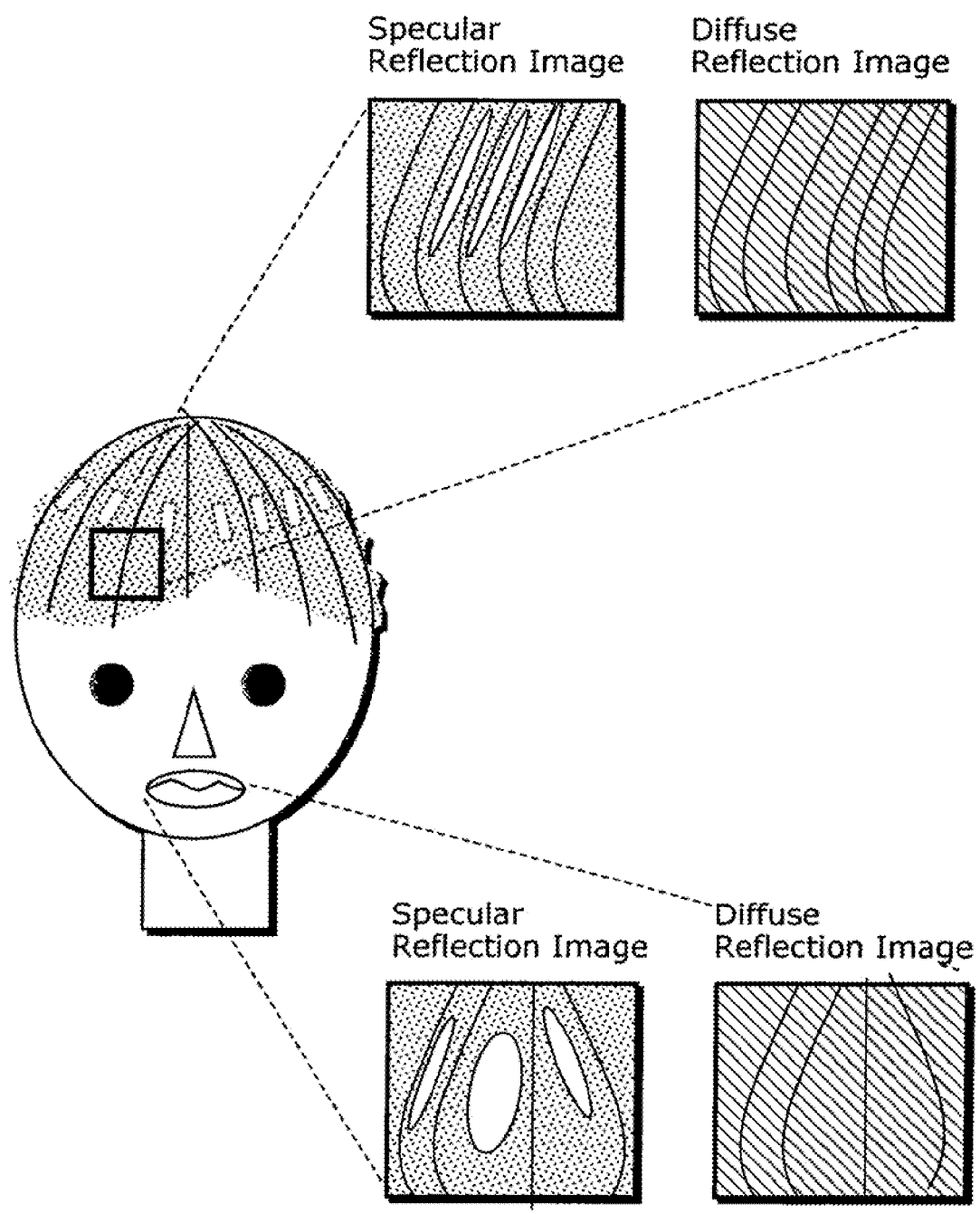
FIG. 25 is a diagram for explaining an exemplum map of a mesostructure of each of a hair region and a lip region.

FIG. 25 is a diagram for explaining an exemplum map of a mesostructure of a hair region. It is assumed that the hair region is also separated into specular reflection components and diffuse reflection components to be a specular reflection image and a diffuse reflection image, respectively. While a diffuse reflection image of black or nearly black hairs almost loses texture, a diffuse reflection image of blonde or brown hairs still has texture. Therefore, using the correlation between the specular reflection image and the diffuse reflection image as described in the variation of the third embodiment, an exemplum map of the specular reflection image can be expanded to cover the entire hair region.

FIG. 25 also shows a lip region that is another example of a region in a human face which has a mesostructure and specular reflection. It is possible also for the lip region to expand an exemplum map using a correlation between a specular reflection image and a diffuse reflection image of the lip region. If the lip wears lipstick having strong reflection, Torrance-Sparrow model or Cook-Torrance model can be used as a reflection model, so that the details are not described here for the lip region.

The geometric parameter modification unit 105 modifies the geometric parameter calculated by the geometric parameter calculation unit 102, by adding the geometric parameter with information indicating the high-resolution component having the mesostructure component spatially expanded by the exemplum expansion unit 104.

The image generation unit 106a generates a high-quality specular reflection image including mesostructure components, using the modified geometric parameters for the reflection model. Then, the high-quality specular reflection image is synthesized with the diffuse reflection image separated by the DS separation unit 1201 or the diffuse reflection image processed by the diffuse reflection image processing unit 1202, thereby generating an output image.

Figure 26A:
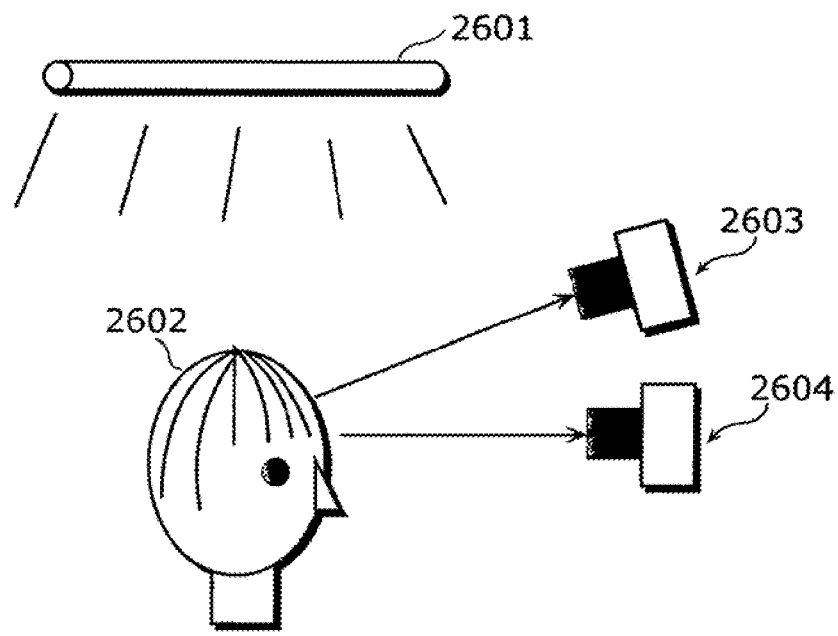
FIG. 26A is a diagram for explaining effects of the fourth embodiment of the present invention.
Figure 26B:
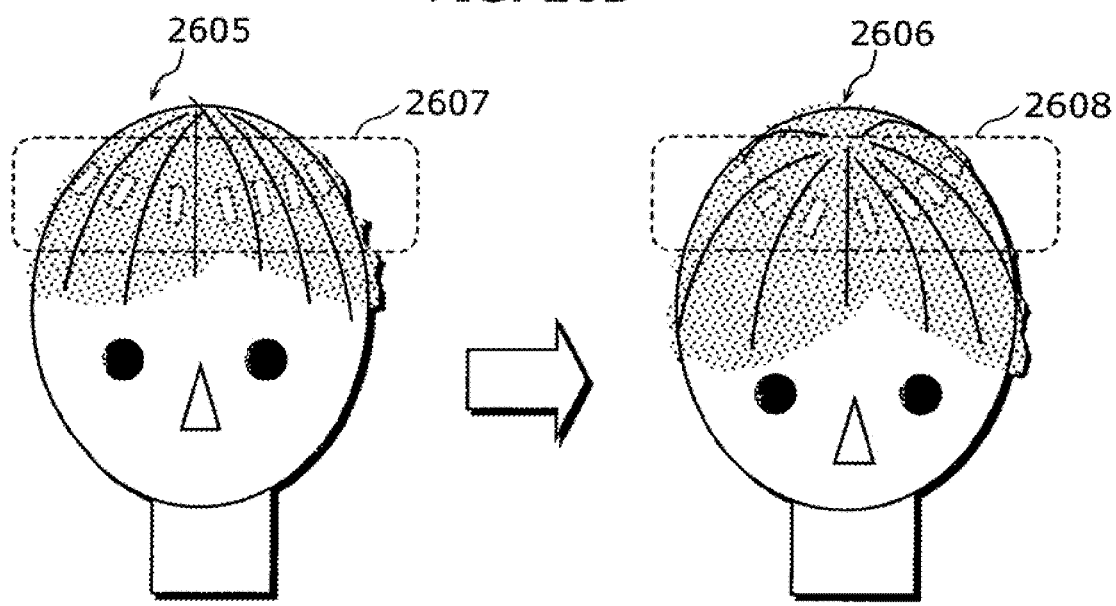
FIG. 26B is a diagram for explaining effects of the fourth embodiment of the present invention.

FIGS. 26A and 26B are diagrams showing effects of the fourth embodiment. FIG. 26A shows a situation of capturing an image of an object. FIG. 26B shows a change of appearance of the object in the captured image.

Here, fixing a light source 2601, an image of a human 2602 or a dummy 2602 with a wig is captured. When a viewpoint (a position of a camera) is changed from a position 2604 to a position 2603, the appearance of the object is changed from appearance 2605 to appearance 2606. The state of reflection on hairs is also changed from reflection 2607 to reflection 2608 depending on an anisotropy structure of the hairs (flow of the hairs or the like). Thereby, the idea of the mesostructure can achieve varying specular reflection as a viewpoint varies, which has been impossible in the prior arts. As a result, reality can be achieved in the resulting image.

FIFTH EMBODIMENT

The following describes the fifth embodiment according to the present invention. The image generation device according to the fifth embodiment is a stereoscopic display device. In recent years, research and development of unaided stereoscopic display devices have been progressed and the unaided stereoscopic display devices have been applied in various fields. One of them is a stereoscopic display device reconstructing texture by displaying high-density directionality.

[Non-Patent Reference 11] Yasuhiro Takagi, "Stereoscopic display reconstructing texture by high-density directionality display" in "Stereoscopic Technology—Cutting edge of 3D Vision, 3D Display, Autostereography and their Applications—", NTS Inc., Oct. 10, 2008, pp 209-221

By the conventional technology, texture, such as sparkling of diamonds, gloss of fabric, or touch of painting, which results from fine change of a light ray direction on a surface of a material difficult to be reconstructed by two-dimensional display, is reconstructed using motion of a viewpoint of a viewer with unaided eyes. For the specular reflection on a material such as crystal, glass, or metal, brightness is dramatically changed as the viewpoint changes. A sampling pitch of light ray required to reconstruct the change is approximately 0.48° when a distance between the object and the viewer is 600 mm. A prototype model of such an unaided stereoscopic display device having high-density directionality has already been made. When an original captured image is inputted to such a stereoscopic display device, the input data should be an image captured from multiple viewpoints with ultrahigh density. Therefore, it is not practical that the image is captured by a plurality of densely arranged small cameras at high-density sampling intervals of 0.48° equal to the intervals in displaying.

In order to solve the above problem, as described in the embodiments of the present invention, bumps on a surface of an object are modeled on a low-resolution image based on a parameter, which makes it possible to generate a high-density multi-viewpoint image. Then, the generated multi-viewpoint image is inputted to the unaided stereoscopic display device to be displayed. Thereby, a high-density multi-viewpoint stereoscopic display device can be implemented.

Although only the image generation device, the image generation method, and their application examples according to the present invention have been described in detail above, those skilled in the art will be readily appreciate that many modifications are possible in the exemplary embodiments and variations without materially departing from the novel teachings and advantages of the present invention. Accordingly, all such modifications are intended to be included within the scope of the present invention.

Furthermore, those skilled in the art will be readily combine the elements in the embodiments and variations without materially departing from the novel teachings and advantages of the present invention.

INDUSTRIAL APPLICABILITY

The present invention is a device that (i) generates, based on information regarding a shape such as bumps of a surface of an object which is generated from a low-quality image of the object, a high-quality image of the object more clearly showing the shape by using a mesostructure of the shape, and also (ii) generates the image under a pseudo light source emitting light from any desired position while showing the shape such as bumps. The present invention can be used as an image generation device or the like which is embedded in an image display apparatus such as a digital camera or a security camera.

The invention claimed is:

1. An image generation device that generates, based on information regarding a shape of a surface of an object, a two-dimensional image of the object which (i) is a high-quality image of the object having a resolution higher than a resolution of a low-quality image from which the information regarding the shape of the surface of the object is obtained and (ii) more clearly shows the shape of the surface of the object than the low-quality image, the object of the two-dimensional image being illuminated by a light source and viewed from a viewpoint, said image generation device comprising:

an information obtainment unit configured to obtain position information of the light source, position information of the viewpoint, and geometric normal information regarding the shape, the geometric normal information specifying a vertical vector of a point on the surface of the object;

a geometric parameter calculation unit configured to calculate, for each point of the surface of the object corresponding to a pixel in the two-dimensional image, a first geometric parameter regarding the shape by performing a predetermined arithmetic operation using the position information of the light source, the position information of the viewpoint, and the geometric normal information;

a high-resolution database unit in which an exemplum is previously stored, the exemplum being a geometric parameter that indicates a mesostructure of a portion of the surface and has a spatial resolution higher than a spatial resolution of the geometric normal information;

an exemplum expansion unit configured to read out the exemplum from said high-resolution database unit, and spatially increase the readout exemplum so that a spatial region indicated by the readout exemplum is expanded to cover the surface of the object in the two-dimensional image;

a geometric parameter modification unit configured to calculate a modified geometric parameter by modifying the first geometric parameter using the spatial region expanded by said exemplum expansion unit;

an image generation unit configured to calculate a pixel value of each of the points of the surface of the object corresponding to a pixel in the two-dimensional image by applying the modified geometric parameter to a reflection model for deciding the pixel value, and to generate the two dimensional image;

a first image capture unit configured to generate the low-quality image by capturing an image of the object; and a separation unit configured to separate the low-quality image generated by said first image capture unit into specular reflection components of the low-quality image and diffuse reflection components of the low-quality image, wherein said geometric parameter calculation unit, said exemplum expansion unit, said geometric parameter modification unit, and said image generation unit perform the calculating of the first geometric parameter, the reading out and the increasing, the calculating of the modified geometric parameter, and the calculating of the pixel value and the generating of the two-dimensional image, respectively, to generate specular reflection components which are different from the specular reflection components of the low-quality image separated by said separation unit, wherein said image generation unit is configured to generate the two-dimensional image by synthesizing (i) an image using the specular reflection components which are different from the specular reflection components of the low-quality image separated by said separation unit with (ii) an image using the diffuse reflection components of the low-quality image separated by said separation unit, wherein said exemplum expansion unit includes an exemplum conformity expansion unit configured to spatially increase the readout exemplum with specular reflection while keeping a correlation between the specular reflection components of the low-quality image and the diffuse reflection components of the low-quality image separated by said separation unit, wherein said exemplum conformity expansion unit is configured to, when expanding a first region image having the specular reflection components of the low-quality image into a second region image having the specular reflection components of the low-quality image, (i) estimate transformation from a third region image having the diffuse reflection components of the low-quality image and corresponding to the first region image into a fourth region image having the diffuse reflection components of the low-quality image and corresponding to the second region image, and (ii) apply transformation equivalent to the estimated transformation to the first region image, in order to spatially increase the readout exemplum, wherein the first geometric parameter is a value of an angle between (i) a half vector generated by adding a unit vector indicating a direction of the light source with a unit vector indicating a direction of the viewpoint and (ii) a geometric normal vector of a point corresponding to the first geometric parameter, the geometric normal vector being the vertical vector of the point on the surface of the object, and wherein the image generation device further comprises:

a second image capture unit configured to generate an image by capturing an image of a portion of the object with a resolution higher than a resolution of the low-quality image, the portion corresponding to a highlight region of the low-quality image to have a higher resolution in the two-dimensional image;

a second geometric parameter estimation unit configured to estimate a second geometric parameter using, as an objective function, a pixel value of the image generated by said second image capture unit, the second geometric parameter indicating the shape of the surface of the object; and an exemplum generation unit configured to generate the exemplum using the second geometric parameter estimated by said second geometric parameter estimation unit, and to store the exemplum into said high-resolution database unit.

2. The image generation device according to claim 1, wherein said information obtainment unit is configured to obtain the geometric normal information by calculating the geometric normal information from information generated by one of a stereo camera, a range finder, and another shape detection device which captures an image of the object.

3. The image generation device according to claim 1, wherein the reflection model is a mathematical expression for calculating a pixel value of a point in the two-dimensional image using the geometric normal information, the position information of the viewpoint, and a geometric parameter which are regarding the point, and wherein said image generation unit is configured to calculate the pixel value of each of the points of the surface of the object corresponding to a pixel in the two-dimensional image by applying, to the reflection model, the geometric normal information and the position information of the viewpoint which are obtained by said information obtainment unit in addition to the modified geometric parameter.

4. The image generation device according to claim 1, wherein said second image capture unit is configured to generate the image by capturing an image of the portion of the object using a zooming function so that the capturing of the image uses a higher zoom than the capturing of the low-quality image.

5. The image generation device according to claim 1, wherein said information obtainment unit is configured to obtain plural pieces of the position information of the light source, wherein said geometric parameter calculation unit is configured to calculate the first geometric parameter for each of the plural pieces of the position information of the light source obtained by said information obtainment unit, wherein said geometric parameter modification unit is configured to calculate the modified geometric parameter for each of the plural pieces of the position information of the light source obtained by said information obtainment unit, and wherein said image generation unit is configured to generate the two-dimensional image for each of the plural pieces of the position information of the light source obtained by said information obtainment unit, respectively.

6. The image generation device according to claim 1, wherein said exemplum conformity expansion unit is configured to, when estimating the transformation from the third region image into the fourth region image, (i) perform wavelet transformation on the third region image and the fourth region image to generate a first feature vector image and a second feature vector image, respectively, and (ii) estimate transformation from the generated first feature vector image into the second feature vector image.

7. An image generation device that generates a two-dimensional image by changing a position of a light source and a viewpoint for an original image generated by imaging an object to a different position and a different viewpoint, respectively, in order to reconstruct reflection on a mesostructure in the original image, the object in the two-dimensional image being seen as illuminated from the different position and viewed from the different viewpoint, said image generation device comprising:

an image capturing unit configured to generate the original image by imaging the object;

a light source information generation unit configured to generate light source information indicating the position of the light source;

a light source information conversion unit configured to convert the light source information to different light source information so that the position is changed to the different position;

a shape reconstruction unit configured to hold shape data indicating a shape of a surface of the object;

a geometric normal estimation unit configured to generate a geometric normal of the object based on the shape data held by said shape reconstruction unit, the geometric normal specifying a vertical vector of a point on the surface of the object;

a viewpoint information generation unit configured to determine the viewpoint, the viewpoint being a position of a camera imaging the object;

a viewpoint conversion unit configured to change the shape data held by said shape reconstruction unit and change the viewpoint determined by said viewpoint information generation unit to the different viewpoint;

a DS separation unit configured to separate the original image captured by said image capturing unit into a specular reflection image and a diffuse reflection image;

a geometric parameter calculation unit configured to calculate a geometric parameter indicating the shape of the surface of the object by performing a predetermined arithmetic operation for each point on the surface using the light source information, the viewpoint, and the geometric normal, each point on the surface corresponding to a pixel in the two-dimensional image;

a specular reflection image mesostructure extraction unit configured to extract an exemplum from the specular reflection image separated by said DS separation unit, the exemplum being a geometric parameter indicating the mesostructure;

an exemplum conformity expansion unit configured to increase the exemplum extracted by said specular reflection image mesostructure extraction unit so that a spatial region indicated by the exemplum is expanded to cover the surface of the object in the two-dimensional image while keeping a correlation between the exemplum and the diffuse reflection image separated by said DS separation unit;

a geometric parameter modification unit configured to calculate a modified geometric parameter by modifying the geometric parameter calculated by said geometric parameter calculation unit using the spatial region expanded by said exemplum conformity expansion unit; and an image generation unit configured to generate the two-dimensional image by calculating a pixel value of each point on the surface by applying the modified geometric parameter to a reflection model for deciding the pixel value, wherein the first geometric parameter is a value of an angle between (i) a half vector generated by adding a unit vector indicating a direction of the light source with a unit vector indicating a direction of the viewpoint and (ii) a geometric normal vector of a point corresponding to the first geometric parameter, the geometric normal vector being the vertical vector of the point on the surface of the object, and wherein said exemplum conformity expansion unit is configured to, when expanding a first region image of the specular reflection image into a second region image of the specular reflection image, (i) estimate transformation from a third region image of the diffuse reflection image and corresponding to the first region image into a fourth region image of the diffuse reflection image and corresponding to the second region image, and (ii) apply transformation equivalent to the estimated transformation to the first region image, in order to increase the exemplum.

8. The image generation device according to claim 7, wherein texture of specular reflection of a hair or a lip is reconstructed as the mesostructure using the reflection model, when the position of the light source and the viewpoint are changed to the different position and the different viewpoint for the original image of the object that is a human head, the original image being imaged from the viewpoint that is a predetermined position.

9. An image generation method of generating, based on information regarding a shape of a surface of an object, a two-dimensional image of the object which (i) is a high-quality image of the object having a resolution higher than a resolution of a low-quality image from which the information regarding the shape of the surface of the object is obtained and (ii) more clearly shows the shape of the surface of the object than the low-quality image, the object of the two-dimensional image being illuminated by a light source and viewed from a viewpoint, said image generation method comprising:

obtaining position information of the light source, position information of the viewpoint, and geometric normal information regarding the shape, the geometric normal information specifying a vertical vector of a point on the surface of the object;

calculating, for each point of the surface of the object corresponding to a pixel in the two-dimensional image, a first geometric parameter regarding the shape by performing a predetermined arithmetic operation using the position information of the light source, the position information of the viewpoint, and the geometric normal information;

reading out, from a high-resolution database unit in which an exemplum is previously stored, the exemplum which is a geometric parameter that indicates a mesostructure of a portion of the surface and has a spatial resolution higher than a spatial resolution of the geometric normal information, and increasing the readout exemplum so that a spatial region indicated by the readout exemplum is expanded to cover the surface of the object in the two-dimensional image;

calculating a modified geometric parameter by modifying the first geometric parameter using the spatial region expanded in said increasing;

calculating a pixel value of each of the points of the surface of the object corresponding to a pixel in the two-dimensional image by applying the modified geometric parameter to a reflection model for deciding the pixel value, and generating the two-dimensional image;

generating the low-quality image by capturing an image of the object; and separating the low-quality image generated by said first image capture unit into specular reflection components of the low-quality image and diffuse reflection components of the low-quality image, wherein said calculating of a first geometric parameter, said reading out and said increasing, said calculating of a modified geometric parameter, and said calculating of a pixel value and said generating of the two-dimensional image are performed to generate specular reflection components which are different from the specular reflection components of the low-quality image separated in said separating, wherein said generating the two-dimensional image includes synthesizing (i) an image using the specular reflection components which are different from the specular reflection components of the low-quality image separated in said separating with (ii) an image using the diffuse reflection components of the low-quality image separated in said separating, wherein said reading out and said increasing include spatially increasing the readout exemplum with specular reflection while keeping a correlation between the specular reflection components of the low-quality image and the diffuse reflection components of the low-quality image separated by said separating, wherein said spatially increasing the readout exemplum with specular reflection includes, when expanding a first region image having the specular reflection components of the low-quality image into a second region image having the specular reflection components of the low-quality image, (i) estimating transformation from a third region image having the diffuse reflection components of the low-quality image and corresponding to the first region image into a fourth region image having the diffuse reflection components of the low-quality image and corresponding to the second region image, and (ii) applying transformation equivalent to the estimated transformation to the first region image, in order to spatially increase the readout exemplum, wherein the first geometric parameter is a value of an angle between (i) a half vector generated by adding a unit vector indicating a direction of the light source with a unit vector indicating a direction of the viewpoint and (ii) a geometric normal vector of a point corresponding to the first geometric parameter, the geometric normal vector being the vertical vector of the point on the surface of the object, and wherein the image generation method further comprises:
  generating an image by capturing an image of a portion of the object with a resolution higher than a resolution of the low-quality image, the portion corresponding to a highlight region of the low-quality image to have a higher resolution in the two-dimensional image;
  estimating a second geometric parameter using, as an objective function, a pixel value of the image generated by capturing the image of the portion of the object with the resolution higher than the resolution of the low-quality image, the second geometric parameter indicating the shape of the surface of the object; and
  an exemplum generation unit configured to generate the exemplum using the estimated second geometric parameter estimated, and to store the exemplum into the high-resolution database unit.

10. A non-transitory computer readable recording medium having stored thereon a computer program recorded for use in an image generation device that generates, based on information regarding a shape of a surface of an object, a two-dimensional image of the object which (i) is a high-quality image of the object having a resolution higher than a resolution of a low-quality image from which the information regarding the shape of the surface of the object is obtained and (ii) more clearly shows the shape of the surface of the object than the low-quality image, wherein, when executed, said computer program causes the image generation device to perform the image generation method according to claim 9.

* * * * *